United States Patent
Gebers et al.

(10) Patent No.: US 10,567,929 B2
(45) Date of Patent: Feb. 18, 2020

(54) SYSTEM AND METHOD FOR FACILITATING COMMUNICATIONS BETWEEN INMATES AND NON-INMATES

(71) Applicant: Inmate Text Service, LLC, Las Vegas, NV (US)

(72) Inventors: Curtis Gebers, Las Vegas, NV (US); Herb Beslanowitch, Las Vegas, NV (US)

(73) Assignee: Inmate Text Service, LLC, Las Vegas, NV (US)

( * ) Notice: Subject to any disclaimer, the term of this patent is extended or adjusted under 35 U.S.C. 154(b) by 0 days.

(21) Appl. No.: 15/926,675

(22) Filed: Mar. 20, 2018

(65) Prior Publication Data

US 2019/0158989 A1 May 23, 2019

Related U.S. Application Data

(60) Provisional application No. 62/588,061, filed on Nov. 17, 2017, provisional application No. 62/627,558, filed on Feb. 7, 2018.

(51) Int. Cl.
| | |
|---|---|
| *H04W 4/14* | (2009.01) |
| *H04L 12/58* | (2006.01) |
| *H04M 3/22* | (2006.01) |

(52) U.S. Cl.
CPC .............. *H04W 4/14* (2013.01); *H04L 51/38* (2013.01); *H04M 3/2281* (2013.01)

(58) Field of Classification Search
CPC ........ H04W 4/14; H04L 51/38; H04M 3/2281
See application file for complete search history.

(56) References Cited

U.S. PATENT DOCUMENTS

| | | | | |
|---|---|---|---|---|
| 6,665,380 B1 * | 12/2003 | Cree | .................... | H04M 3/533 379/265.01 |
| 9,143,609 B2 | 9/2015 | Hodge | | |
| 9,426,303 B1 * | 8/2016 | Edwards | ................ | H04M 11/00 |
| 9,621,714 B2 | 4/2017 | Seyfetdinov | | |

(Continued)

OTHER PUBLICATIONS

Screen captures from ConnectNetwork GTL, Retrieved from internet: https://web.connectnetwork.com/, Jun. 20, 2018.

(Continued)

*Primary Examiner* — Mazda Sabouri
(74) *Attorney, Agent, or Firm* — Howard & Howard Attorneys PLLC

(57) ABSTRACT

The present invention provides a system and method for incoming and outgoing electronic messages with inmates, including a database including a plurality of user records, wherein the user records include a plurality of user profiles and a plurality of inmate profiles, wherein each of the user profiles includes a user ID, a mobile ID, a carrier, and at least one inmate account number. Each of the inmate profiles includes an inmate user ID, a carrier, a current account balance, and at least one user account number. The system and method also includes an application server including a processor programmed to receive a message from a new user profile, determine a carrier of the user profile, process the new user profile based on the carrier, wherein the carrier is determined by a triggering event, and send the new user profile to an appropriate list for future messaging.

13 Claims, 18 Drawing Sheets

| Action Record ID | Triggering Event | Action Event Data | Action Event |
|---|---|---|---|
| Action001 | Receive Message | Determine whether message received is from a current civilian user | Application Server Event |
| Action002 | Current Civilian sends message | Pair the current civilian with inmate account number | Application Server Event |
| Action003 | Receive message with emoticons | Remove emoticons from the message | Application Server Event |
| Action004 | Receive message with images | Remove images from message received | Application Server Event |
| Action005 | Send received messages to 3rd party server | Send the images removed from the message to a 3rd party server and print out the images to be given to the inmate. | External Server Event |
| Action006 | Unpaid Inmate Account Balance | Send a message that the inmate cannot receive any messages until the account balance is paid. | Application Server Event |

(56) References Cited

U.S. PATENT DOCUMENTS

| | | | |
|---|---|---|---|
| 9,667,663 B2 | 5/2017 | Hodge et al. | |
| 9,930,171 B1* | 3/2018 | Parampottil | H04M 3/2281 |
| 2001/0036821 A1* | 11/2001 | Gainsboro | H04M 3/2281 |
| | | | 455/410 |
| 2006/0285650 A1* | 12/2006 | Hodge | H04M 3/2281 |
| | | | 379/32.01 |
| 2007/0116211 A1* | 5/2007 | Csabai | H04M 3/38 |
| | | | 379/93.03 |
| 2009/0207987 A1* | 8/2009 | Ryan | H04M 3/2281 |
| | | | 379/188 |
| 2010/0189228 A1* | 7/2010 | Seyfetdinov | H04M 3/42 |
| | | | 379/88.14 |
| 2011/0286585 A1* | 11/2011 | Hodge | H04M 1/67 |
| | | | 379/88.02 |
| 2012/0014517 A1* | 1/2012 | Orr | H04M 3/382 |
| | | | 379/142.05 |
| 2012/0281058 A1* | 11/2012 | Laney | H04N 7/147 |
| | | | 348/14.03 |
| 2013/0308499 A1* | 11/2013 | Hodge | H04M 3/2281 |
| | | | 370/259 |
| 2014/0044242 A1* | 2/2014 | Hodge | H04M 3/533 |
| | | | 379/68 |
| 2014/0218466 A1* | 8/2014 | Bloms | H04N 7/152 |
| | | | 348/14.09 |
| 2014/0219432 A1* | 8/2014 | Bengston | H04M 3/2281 |
| | | | 379/196 |
| 2014/0270126 A1* | 9/2014 | Torgersrud | H04M 3/38 |
| | | | 379/189 |
| 2014/0280559 A1* | 9/2014 | Torgersrud | H04L 67/22 |
| | | | 709/204 |
| 2014/0348321 A1 | 11/2014 | Javaregowda et al. | |
| 2016/0066182 A1* | 3/2016 | Hodge | H04W 4/24 |
| | | | 455/411 |
| 2016/0219146 A1 | 7/2016 | Hodge et al. | |
| 2016/0381082 A1* | 12/2016 | Hodge | H04L 51/066 |
| | | | 726/5 |
| 2017/0208468 A1 | 7/2017 | Hodge et al. | |
| 2017/0251100 A1* | 8/2017 | Keiser | H04L 63/10 |
| 2017/0272440 A1* | 9/2017 | Hodge | H04L 63/20 |

OTHER PUBLICATIONS

Downloaded from TextInmate.com by Phone Donkey, Retrieved from internet: https://textinmate.com/, Jun. 20, 2018.

Downloaded from Inmate Phone Texting Pictures, Retrieved from Internet: https://klolk.com/, Jun. 20, 2018.

Screen captures from Affordable Inmate Calling Services, Retrieved from Internet: https://www.aicsllc.net/, Jun. 20, 2018.

Non-Final Office Action (U.S. Appl. No. 16/049,375); dated Jul. 11, 2019.

* cited by examiner

| Action Record ID | Triggering Event | Action Event Data | Action Event |
|---|---|---|---|
| Action001 | Receive Message | Determine whether message received is from a current civilian user | Application Server Event |
| Action002 | Current Civilian sends message | Pair the current civilian with inmate account number | Application Server Event |
| Action003 | Receive message with emoticons | Remove emoticons from the message | Application Server Event |
| Action004 | Receive message with images | Remove images from message received | Application Server Event |
| Action005 | Send received messages to 3rd party server | Send the images removed from the message to a 3rd party server and print out the images to be given to the inmate. | External Server Event |
| Action006 | Unpaid Inmate Account Balance | Send a message that the inmate cannot receive any messages until the account balance is paid. | Application Server Event |

FIG. 7

| Civilian User ID | Mobile ID | Inmate Account Number | Action Rule File | Rule Description | Notification Message File | Messaging Information |
|---|---|---|---|---|---|---|
| Molly859 | 963-852-7411 | N/A | Action00 1.1. API | Determine whether message received is from a current civilian user | InfoMessage 001.1 | Ask for inmate account or inmate user ID to be paired |
| Mary379 | 123-456-7899 | 123456 | Action00 2.1. API | Pair the current civilian with inmate account number | InfoMessage 002.1 | Pair the civilian profile with the correct inmate profile |
| Mary379 | 123-456-7899 | 741852 | Action00 6.1. API | Send message to pay inmate account balance | InfoMessage 006.1 | Send a message that the inmate cannot receive any messages until the account balance is paid. |

FIG. 8

| Civilian User ID | Mobile ID | Inmate Account Number | Inmate User ID | Current Account Balance |
|---|---|---|---|---|
| Mary379 | 123-456-7899 | 123456 | Bob378 | $213.45 |
| Edward398 | 987-654-3211 | 654321 | Bob378 | $213.45 |
| Ryan659 | 741-852-9633 | 741852 | Frank582 | (-)$25.00 |

| Inmate User ID (56) | Current Account Balance (58) | Associated Account Number (60) | Associated Civilian Mobile ID (64) | Carrier (116) |
|---|---|---|---|---|
| Bob378 | $213.45 | 123456 | 123-456-7899 | Aerialink/Geneseo (SVR) |
| Bob378 | $213.45 | 654321 | 987-654-3211 | Aerialink/Geneseo (SVR) |
| Frank582 | (-)$25.00 | 741852 | 741-852-9633 | Bandwidth CLEC (Sybase) |

| Civilian User ID (62) | Mobile ID (64) | Inmate Account Number (60) | Carrier (118) |
|---|---|---|---|
| Mary379 | 123-456-7899 | 123456 | AT&T Local |
| Edward398 | 987-654-3211 | 654321 | BHNIS |
| Ryan659 | 741-852-9633 | 741852 | Bluegrass Cellular |

FIG. 15

| Action Record ID | Triggering Event | Action Event Data | Action Event |
|---|---|---|---|
| Action010 | Determine Carrier of the New User | Determine whether the carrier of the new user is an allowed carrier or not. | Application Server Event |
| Action011 | Send the user profile to an appropriate list | Upon determining the new user carrier, send to either an allowed list or a blocked list of carriers. | Application Server Event |
| Action012 | Send received carrier to 3$^{rd}$ party server | Send the new user information to a 3$^{rd}$ party server to determine the carrier. | External Server Event |
| Action013 | Receive SMS Message that includes a predetermined amount of characters | Break the SMS message into a plurality of SMS messages. | Application Server Event |
| Action014 | Receive a plurality of SMS messages | Convert the plurality of SMS messages into one MMS message. | Application Server Event |
| Action015 | Receive the MMS message | Convert the MMS message into a readable SMS message | Application Server Event |
| Action016 | Send the MMS message to a 3$^{rd}$ party server | Send the MMS message to a 3$^{rd}$ party server to be converted to a readable SMS message | External Server Event |

FIG. 16

| Civilian User ID | Inmate Account Number | Carrier | Action Rule File | Rule Description | Notification Message File | Messaging Information |
|---|---|---|---|---|---|---|
| Mary379 | 123456 | AT&T Local | Action01 1.1. API | Upon determining the new user carrier, send to either an allowed list or a blocked list of carriers. | InfoMessage 011.1 | Send user profile to the allowed list or the blocked list of carriers |
| Mary379 | 123456 | AT&T Local | Action01 5.1. API | Convert the MMS message into a readable SMS message | InfoMessage 015.1 | Send the MMS message to a 3rd party server to be converted to an SMS message |
| Mary379 | 123456 | AT&T Local | Action01 6.1. API | Send the MMS message to a 3rd party server to be converted to a readable SMS message | InfoMessage 016.1 | Send the MMS message to be sent back as a SMS message |

FIG. 17

SYSTEM AND METHOD FOR FACILITATING COMMUNICATIONS BETWEEN INMATES AND NON-INMATES

BACKGROUND OF THE INVENTION

The present application claims priority to and the benefit of U.S. Provisional Patent Application Ser. No. 62/588,061, filed Nov. 17, 2017 and U.S. Provisional Patent Application Ser. No. 62/627,558, filed Feb. 7, 2018, both disclosures of which are hereby incorporated by reference in their entirety.

BACKGROUND OF THE INVENTION

1. Field of the Invention

The present invention relates generally to the field of electronic messaging exchange in penal institutions or similar facilities and, more particularly, to a system and method that is centralized and self-contained with the capacity to monitor, control access, and bill for usage of electronic messaging in penal institutions or similar facilities.

2. Description of the Related Art

Typical electronic messaging exchange systems for residents of controlled environments such as penal institutions or similar facilities include a centralized call center from which residents (also known as inmates) can make telephone calls over hardwired landlines. Alternatively, there may be several hardwired telephones scattered throughout the facility from which the inmates can make calls.

In the electronic messaging exchange system, all telephone calls and messaging are routed through a central processing center, which may be located on-site or off-site. The processing center can conventionally act as a local switching center for connecting calls, or can perform security functions, such as caller authentication, call monitoring, etc. In addition, the processing center assigns each inmate a SIM card or a personal phone number requiring a mass amount of SIM cards and personal phone numbers.

The restriction to using a personal phone number or separate SIM card for every inmate hampers the inmate communication and is relatively cumbersome, potentially leading to a system failure if overloaded with information.

SUMMARY OF THE INVENTION

The present invention provides a system for facilitating incoming and outgoing electronic messages including a database having a plurality of user records. The user records include a plurality of user profiles and a plurality of inmate profiles. Each of the user profiles includes a user ID, a mobile ID associated with a mobile device, a carrier, and at least one inmate account number. Each of the inmate profiles includes an inmate user ID, a carrier, a current account balance, and at least one user account number. The system also includes an application server having a processor programmed to receive a message from a new user profile, determine a carrier of the new user profile, process the new user profile based on the carrier, wherein the carrier is determined by a triggering condition, and send the new user profile to an appropriate list for future messaging.

In another embodiment, the present invention provides a method for facilitating incoming and outgoing electronic messages including the steps of accessing a database having a plurality of user profiles and a plurality of inmate profiles. Each of the user profiles includes a user ID, a mobile ID associated with a mobile device, a carrier, and at least one inmate account number. Each inmate profile includes an inmate user ID, a carrier, a current account balance, and at least one user account number. The method also includes the steps of receiving a message from a new user profile, determining a carrier of the new user profile, processing the new user profile based on the carrier, wherein the carrier is determined by a triggering condition, and sending the new user profile to an appropriate list for future messaging.

In yet another embodiment, the present invention provides one or more non-transitory computer-readable storage media, having computer executable instructions embodied thereon, wherein when executed by at least one processor, the computer-executable instructions cause the processor to access a database including a plurality of user profiles and a plurality of inmate profiles. Each of the user profiles includes a user ID, a mobile ID associated with a mobile device, a carrier, and at least one inmate account number. Each of the inmate profiles includes an inmate user ID, a carrier, a current account balance, and at least one user account number. The computer-executable instructions cause the processor to receive a message from a new user profile, determine a carrier of the new user profile, process the new user profile based on the carrier, wherein the carrier is determined by a triggering condition, and send the new user profile to an appropriate list for future messaging.

In another embodiment, the present invention provides a system for facilitating incoming and outgoing electronic messages including a database having a plurality of user records. The user records include a plurality of user profiles and a plurality of inmate profiles. Each of the user profiles includes a user ID, a mobile ID associated with a mobile device, a carrier, and at least one inmate account number. Each of the inmate profiles includes an inmate user ID, a carrier, a current account balance, and at least one user account number. The system also includes an application server having a processor programmed to receive a SMS message from a first user, determine whether the SMS message includes a predetermined amount of characters, break the SMS message into a plurality of SMS messages if the SMS message includes the predetermined amount of characters, convert the plurality of SMS messages into a plurality of MMS messages, receive the plurality of MMS messages, wherein the plurality of MMS messages includes an image of the plurality of SMS messages, convert the plurality of MMS messages into a plurality of readable SMS messages, and send the plurality of readable SMS messages to a second user.

In yet another embodiment, the present invention provides a method for facilitating incoming and outgoing electronic messages including the steps of accessing a database having a plurality of user profiles and a plurality of inmate profiles. Each of the user profiles includes a user ID, a mobile ID associated with a mobile device, a carrier, and at least one inmate account number. Each inmate profile includes an inmate user ID, a carrier, a current account balance, and at least one user account number. The method also includes the steps of receiving a SMS message from a first user, determining whether the SMS message includes a predetermined amount of characters, breaking the SMS message into a plurality of SMS messages if the SMS message includes the predetermined amount of characters, converting the plurality of SMS messages into a plurality of MMS messages, receiving the plurality of MMS messages, wherein the plurality of MMS messages includes an image of the plurality of SMS messages, converting the plurality of MMS messages into a plurality of readable SMS messages, and sending the plurality of readable SMS messages to a second user.

In yet another embodiment, the present invention provides one or more non-transitory computer-readable storage media, having computer executable instructions embodied thereon, wherein when executed by at least one processor, the computer-executable instructions cause the processor to access a database including a plurality of user profiles and a plurality of inmate profiles. Each of the user profiles includes a user ID, a mobile ID associated with a mobile device, a carrier, and at least one inmate account number. Each of the inmate profiles includes an inmate user ID, a carrier, a current account balance, and at least one user account number. The computer-executable instructions cause the processor to receive a SMS message from a first user, determine whether the SMS message includes a predetermined amount of characters, break the SMS message into a plurality of SMS messages if the SMS message includes the predetermined amount of characters, convert the plurality of SMS messages into a plurality of MMS messages, receive the plurality of MMS messages, wherein the plurality of MMS messages includes an image of the plurality of SMS messages, convert the plurality of MMS messages into a plurality of readable SMS messages, and send the plurality of readable SMS messages to a second user.

Other advantages of the present invention will be readily appreciated, as the same becomes better understood, by reference to the following detailed description when considered in connection with the accompanying drawings.

BRIEF DESCRIPTION OF THE DRAWINGS

FIGS. 5-9 are table views illustrating exemplary database records generated by the system of FIG. 1.

FIG. 14-19 are table views of exemplary database records generated by the system of FIG. 1.

Corresponding reference characters indicate corresponding components throughout the several views of the drawings.

DESCRIPTION OF THE PREFERRED EMBODIMENT(S)

Figure 1:
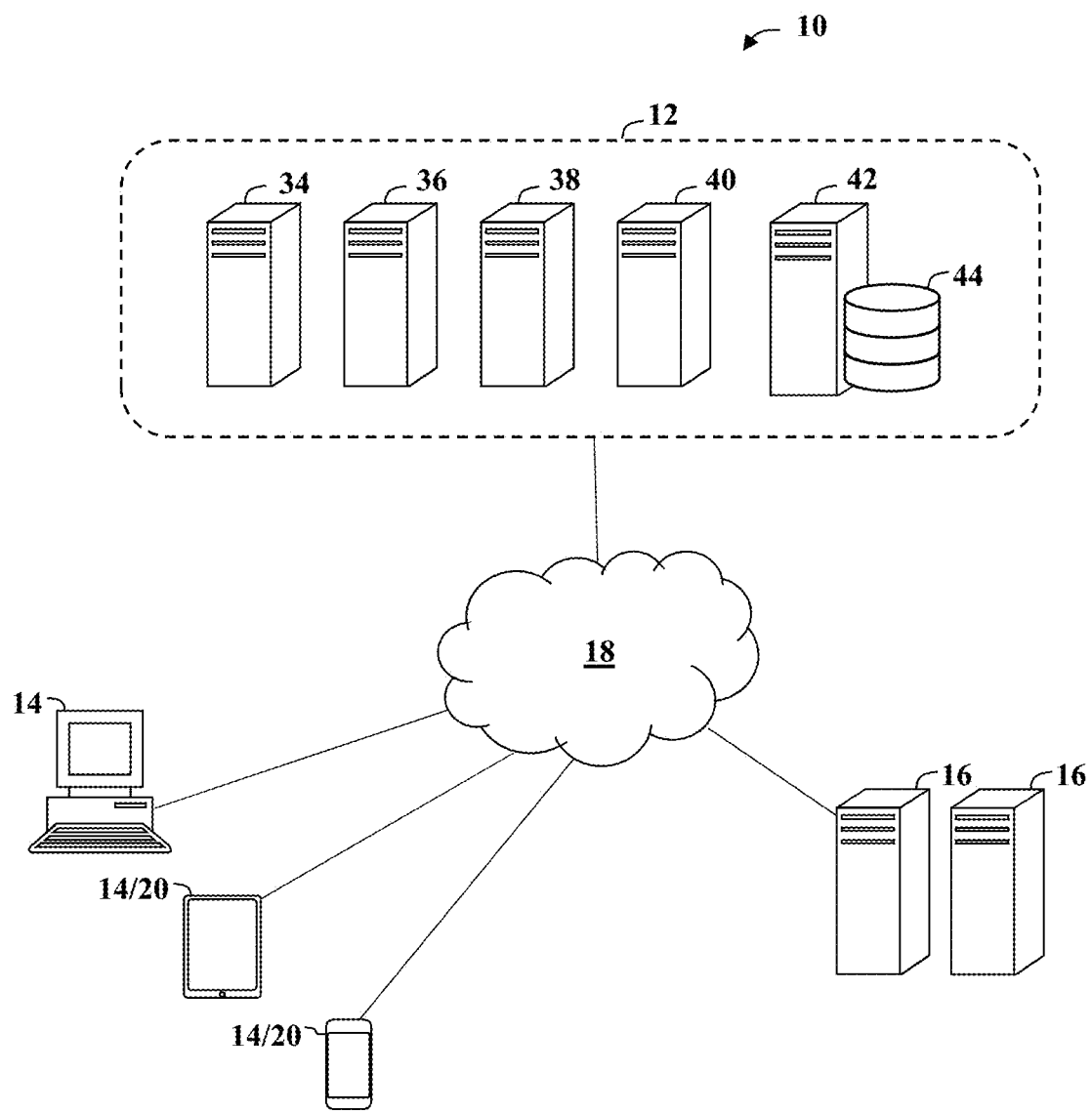
FIG. 1 is a schematic view illustrating various aspects of a system, according to the present invention.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, a reasonable programmable read-only memory (CDROM), an optical storage device, and a magnetic storage device. Computer program code for carrying out operations of the present invention may be written in any combination of one or more programming languages.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will be appreciated that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instructions which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

In general, the present invention provides a system 10 such as a networked computer system that is configured to generate information related processing of incoming and outgoing messages between inmates and non-inmates or civilians. The system 10 includes application software that enables the system to provide a platform for penal institutions to monitor, control access, and bill for usage of such a system including determining specific data about users sending messages between inmates and non-inmates or civilians, and withholding messages if the data does not meet a predefined criteria. It should be appreciated that the term "inmate" refers to a "person in a prison or jail" or "incarcerated individual". It also should be appreciated that the term "civilian" refers to a "non-inmate" and "civilians" refers to "non-inmates" as used in the subsequent description.

The application software provides the system 10 with a platform to allow civilians and inmates to send messages back and forth on a secure network without burning out the system 10 using multiple SIM cards/phone numbers. The system 10 assigns the civilian's phone number to a specific inmate user ID. The user ID may have multiple inmate account numbers associated with the inmate user ID, allowing the inmate to send and receive messages with multiple civilians using separate SIM cards or phone numbers. The application software allows the inmates and civilians to spend less money messaging each other. The application software uses less SIM cards/phone numbers to keep the overall costs down. The application software includes a program version that has a user version available in all the application stores and potentially pre-installed as a part of default carrier software loads (for example: AT&T, Sprint, Verizon, etc.) that will provide the functionality to be described below. Several elements discussed below and/or claimed are described as being provided for, or, by "a user", "an inmate", or "a civilian" and may be interchangeable throughout and described below.

In addition, the system 10 provides a way for the inmate to communicate with the civilian over a network that will not burn out or overload the system 10. Moreover, the system 10 communicates with a mobile device associated with the inmate or the civilian to provide notifications to the mobile device including messages about incoming messages and whether a civilian has opted-in. In addition, the system 10 may send outgoing actions to $3^{rd}$ party computer servers to print images that were removed from messages, determine a user's carrier, and convert MMS messages into SMS messages. The external server may communicate with the $3^{rd}$ party computer server to send the image to be printed for mailing or delivering to the inmate. In addition, the external server may communicate with the $3^{rd}$ party computer server to send carrier information to the application server. The external server may communicate with the $3^{rd}$ party computer server to convert MMS messages into SMS messages using, for example, optical character recognition systems. The system 10 determines through the application server the action events and triggering events 70 between the external server and the $3^{rd}$ party computer server. The system 10 may then transmit push notifications to the user with information about images that were removed and printed for the inmate. The system 10 may also include a mobile computer application being stored on a mobile device associated with the user. The mobile application uses location and public API's to send notifications to the user. For example, in one embodiment, the civilian may receive a notification that the inmate has sent a message where the civilian may send a message back that includes an image. The system 10 may send the image to the $3^{rd}$ party server to be printed and mailed to the inmate through the postal service. The system 10 may send the MMS message to an optical character recognition system to convert the MMS message into a SMS message.

The system 10 is configured to generate and store user data records associated with inmates and civilians that include information associated user accounts and messages being sent between the inmate and the civilian. The system 10 also determines action events that are associated with the messages sent between the inmate and the civilian. The system 10 generates and stores action records that include information associated with actions to be performed by the system 10 upon detecting activities being performed by the user. For example, the action events may include determining whether the civilian profile is a current civilian profile and determining whether the message sent by the civilian to the inmate meets the predefined criteria.

In addition, the user data records may include triggering events that are detected by the system 10 to initiate the action events. The triggering events may include, for example, receiving a message that includes too many characters in the message, at least one emoticon, at least one image, receiving a new user profile, receiving a carrier, and receiving a MMS message.

By generating action records 68 associated with user activities that include triggering events that trigger corresponding system actions, the system 10 improves the speed and functionality of known computing systems by reducing the amount of computing time required to monitor user activity, thus reducing the computing resources required to generate and display relevant data messages from multiple programs to the user.

In addition, the system 10 reduces the computing resources required to manage the data information associated with the sending of information between the inmate and the civilian over known systems by generating data files associated with inmate profiles and civilian profiles that can be quickly paired based on current user record data to generate electronic messaging using limited computing resources.

In addition, the system 10 reduces the computing resources required to manage the data information associated with the sending of information between the inmate and the civilian over known systems by blocking correspondence based on the user carrier information and converting MMS messages to SMS messages using IP based numbers.

Referring to FIG. 1, in one illustrated embodiment, the system 10 includes a server system 12 that is coupled in communication with one or more user computing devices 14 and one or more $3^{rd}$ party computer servers 16 via a communications network 18. The server system 12 may be any suitable server, including an internet transaction server (ITS), an ATG application server or an ATG application instance, a Dynamo server, etc . . . , and may utilize any suitable or combination of technologies configured to enable efficient communication. The communications network 18 may be any suitable connection, including the Internet, Voice Over IP (VoIP), file transfer protocol (FTP), an Intranet, LAN, a virtual private network (VPN), cellular networks, etc . . . , and may utilize any suitable or combination of technologies including, but not limited to wired and wireless connections, always on connections, connections made periodically, and connections made as needed.

The user computing device 14 may include any suitable device that enables the user to access and communicate with the system 10 including sending and/or receiving information to and from the system 10 and displaying information received from the system 10 to the user. For example, in one embodiment, the user computing device 14 may include, but is not limited to, a desktop computer, a laptop or notebook computer, a tablet computer, a smartphone/tablet computer hybrid, a personal data assistant, a handheld mobile device including a cellular telephone, and the like. The user computing device 14, as well as any other connected computer systems and their components included in the system 10, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. The messages being sent and received between the user computing devices 14 may be short message service messages (SMS), multimedia messaging service (MMS), etc. SMS messaging, also known as text messaging, is a way to send short, text-only messages from one user computing device 14 to another. MMS messaging allows the user computing devices 14 to send each other multimedia messages, for example, images, slideshows, audio files, audio clips, etc.

In one embodiment, the user computing device 14 includes a mobile computing device 20 (shown in FIG. 2) such as, for example, a smartphone such as an iPhone™. The mobile computing device 20 includes a processor coupled to a memory device, and a database for storing various programs and data for use in operating the mobile computing device 20. The mobile computing device 20 may also include a touchscreen display device 22, one or more video image cameras 24, one or more speakers 26, a microphone 28, at least one input button 30, and one or more sensors including, but not limited to, a touch ID fingerprint sensor coupled to an input button 30, a barometer, a three-axis gyro, an accelerometer, a proximity sensor, and an ambient light sensor. In addition, the mobile computing device 20 may also include a Wi-Fi antenna, a cellular network antenna, a Bluetooth™ communications device, assisted GPS and GLONASS, a digital compass, and an iBeacon microlocation device.

Figure 2:
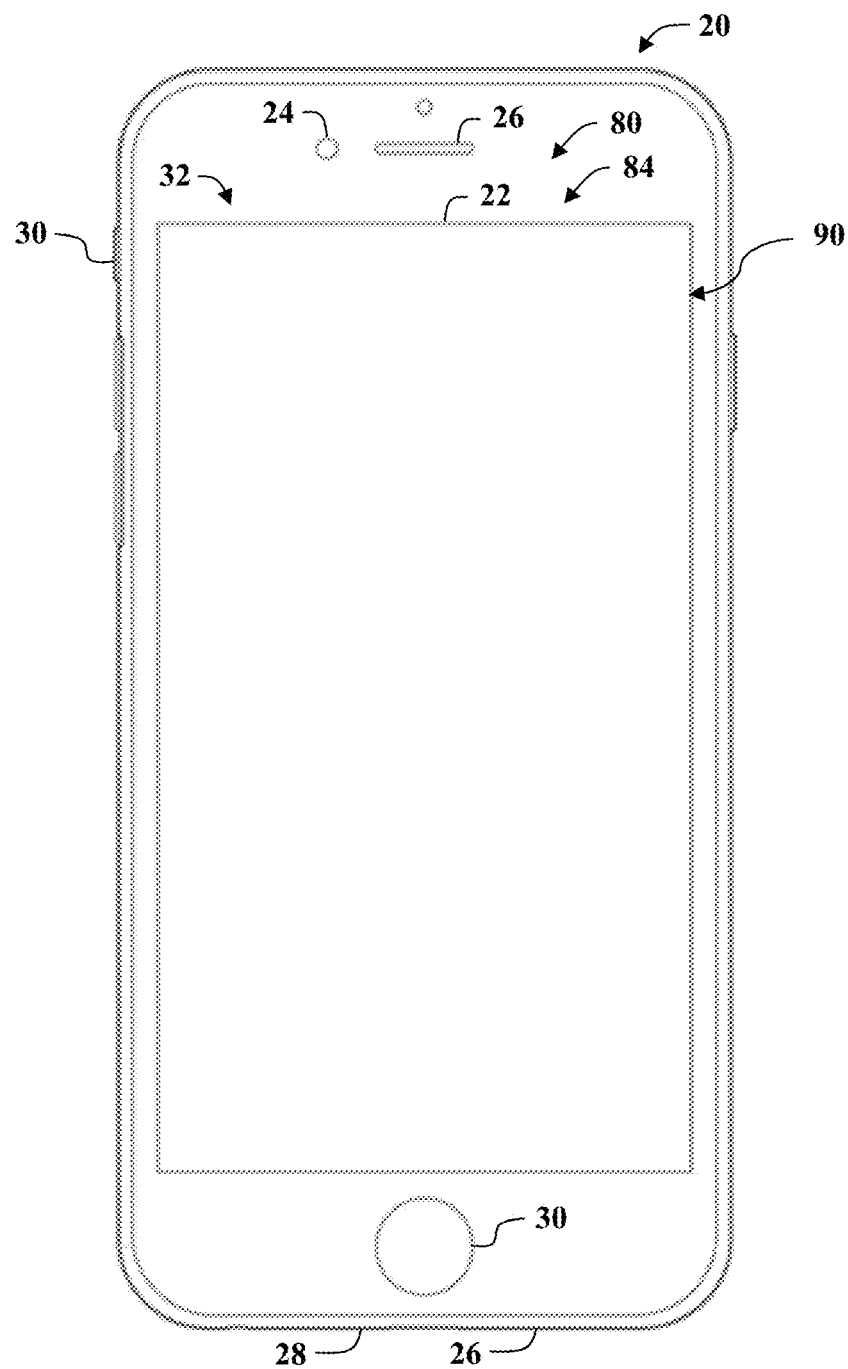
FIG. 2 is a plan view of a component of the system of FIG. 1.

In the illustrated embodiment of FIG. 2, the mobile computing device 20 includes a web browser programmed and stored in the memory device. The processor executes the web browser program to display web pages on the touchscreen display device 22 that includes information received from the server system 12 to enable the user to interact with and operate the server system 12. In addition, the mobile computing device 20 may be programmed to store and execute a mobile program application, e.g., a mobile application, that displays a user interface 32 on the touch screen display device 22 that allows the user to access the server system 12 to retrieve and store information within the server system 12 as well as interact with and operate the server system 12. In addition, in one embodiment, the system 10 may install one or more mobile application programs in the memory device of the mobile computing device 20. When initiated by the processor of the mobile computing device 20, the mobile application program causes the processor of the mobile computing device 20 to perform some or all of the functions of the server system 12.

The 3$^{rd}$ party computer servers 16 include information and data associated with the processing of images removed from incoming messages, determining the carriers of new users, and converting MMS messages into SMS messages. For example, in one embodiment, the 3$^{rd}$ party computer servers 16 may include information associated with an image printing system that receives a request to print images to be mailed to the inmates.

In the illustrated embodiment of FIG. 1, the server system 12 includes one or more servers such as a website hosting server 34, a search engine server 36, an application server 38, an external server 40, a database server 42, and a database 44. The database server 42 includes a memory device that is connected to the database 44 to retrieve and store information contained in the database 44. The database 44 contains information on a variety of matters, such as, for example, web pages associated with one or more websites, a plurality of user records, a plurality of user IDs, a plurality of mobile IDs, a plurality of inmate account numbers including account data, action events, trigger events, notification messages, mobile device identifiers, mobile device application program interfaces (APIs), and/or any suitable information that enables the system 10 to function as described herein. In one embodiment, some or all of the information contained in the database 44 may also be stored in the database of the mobile computing device 20.

Figure 5:
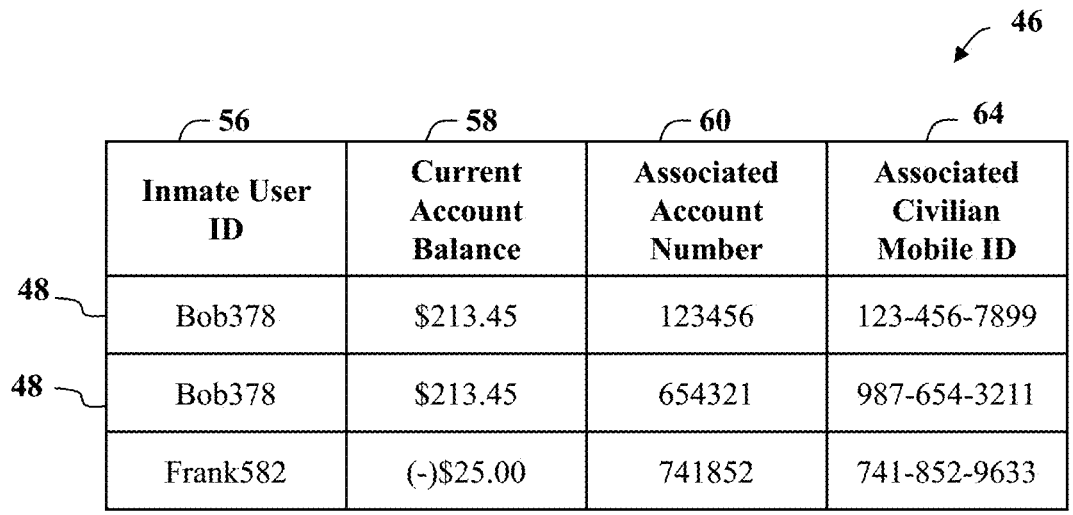
Figure 6:
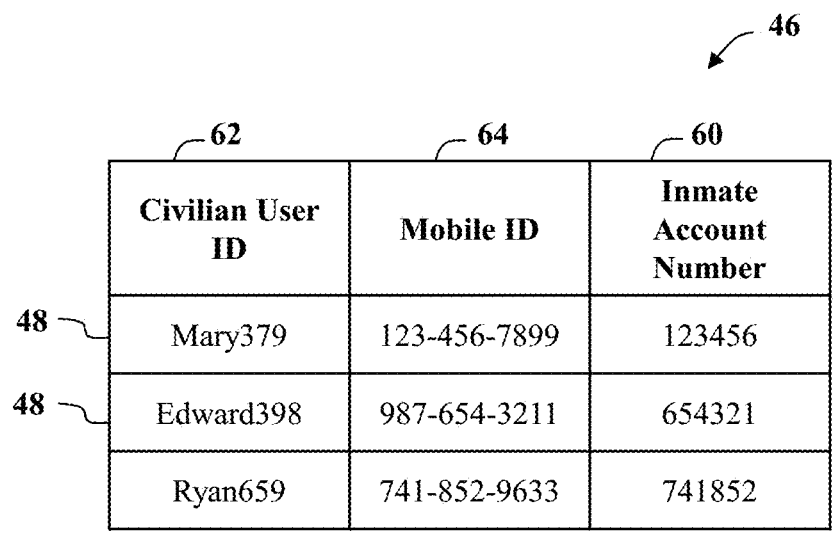

In one embodiment, the database 44 includes a user records list 46 (shown in FIGS. 5 and 6) that includes a plurality of user records 48. Each user record 48 includes a unique user profile 50. The unique user profile 50 can be an inmate profile 52 or a civilian profile 54. Each inmate profile 52 includes a unique user inmate user ID 56, a current account balance 58, and at least one user account number 60. The at least one user account number 60 is associated with a civilian user ID. The civilian user ID 62 may also be a code word to help identify the civilian profile 54. Each civilian profile 54 includes a unique civilian user ID 62 associated with a corresponding civilian, a mobile ID 64 associated with a mobile computing device 20, and at least one inmate account number 60. The unique civilian user ID 62 and the unique inmate user ID 56 include user identifying data such as, for example, a unique ID and/or password, and may also include user contact information such as, for example, a phone number, an e-mail, and/or a mobile device data associated with a mobile computing device 20 associated with the user. For example, the mobile device data may include, but is not limited to, the unique mobile device ID 64, operating system, phone number, IP address, mobile device API, and/or any suitable information that enables the system 10 to communicate with the corresponding mobile computing device 20. The data associated with the inmate account number 60 includes the inmate identifying data such as, for example, a unique ID and/or password and an account balance. Each inmate account number 60 is associated with a separate device to facilitate the data between the system 10 and the civilian mobile user device 20.

In one embodiment, the database 44 also includes an action event record list 66 (shown in FIG. 7) that includes a plurality of action event records 68. Each action event record 68 may include a triggering event 70, action event data 72, and the action event 74. The system 10 may initiate the action event 74 once the action event is triggered by the triggering event 70. By the action event 74 being triggered by the triggering event 70, the action event 74 may then send the action event 74 to the corresponding server, dependent on which action event 74 has been triggered. Action event data 72 includes information and data including, but is not limited to, determining whether a civilian user profile is a current user or not, determining whether a message has been sent, determining whether the message includes predefined criteria, and determining the civilian profile that is paired with the inmate profile. As shown in FIG. 7, the action event data 72 description may include data associated with the corresponding action record. For example, in one embodiment, the action event data 72, Action003, includes information that enables the system 10 to remove any emoticons from the message being sent to the inmate profile. The triggering event data includes data associated with the triggering event 70 that includes an event or occurrence that may be detected by the system 10. The triggering events 70 may include, but are not limited to, requests and/or signals received by the user computing device 14, for example, the civilian profile may send a message including emoticons and/or images, messages that contain too many characters, too many messages sent in a predetermined amount of time, and receiving a civilian profile that is not current or opted in. Once the system 10 initiates the triggering event 70, the triggering event 70 triggers the corresponding action event 74, which will send the action event data 72 to the corresponding server.

The database 44 may also include a user action record list 76 (shown in FIG. 9) that includes a plurality of user action records 78 that are associated with a plurality of users. Each user action record 76 includes the user record 48 associated with the corresponding user ID 56/62, the action record ID 68, the triggering event 70, and action event data 72. In addition, the user action record 78 may also include messaging information 80 having data and information to be sent with a mobile computing device 20 associated with the corresponding user profile 52/54 and/or API information associated with the corresponding mobile computing device 20. In one embodiment, the messaging information 80 may also include contact information such as, for example, emails, and/or text, and phone numbers. The application server 38 may identify one or more additional users that may receive notifications generated by the website hosting server 34 and include contact information associated with the identified additional users in the messaging information 80 that has sent or received a message using the system 10.

The website hosting server 34 is configured to host a website that is accessible by the user (also known as civilian or inmate) via one or more user computing devices 14. The website hosting server 34 retrieves and stores web pages 82 associated with one or more websites in response to requests received by the civilian or inmate via the user computing device 14 to allow consumers to interact with the web site and send and receive messages to the desired inmate in a penal institution. In one embodiment, the website hosting server 34 is configured to generate and display the messages on the inmate's user computing device 14 in response to messages being sent and received from the civilians profile via the corresponding web browsers that are displayed on the user computing devices 14. In addition, the website hosting server 34 may be configured to generate and display a mobile web page, the mobile web page can be either the civilian web page 82 or the inmate web page 82 that is displayed on one or more mobile computing devices 20. For example, in one embodiment, the website hosting server 34 may display a message sent to the inmate with less than 160 characters and that doesn't include any images or emoticons.

In the illustrated embodiment, the search engine server 36 is configured to receive a search request from the website hosting server 34 and/or the application server 38 including one or more search terms, and generate search data including a plurality of user records as a function of the search terms. For example, in one embodiment, the search engine server 36 may initiate a search algorithm based on a Boolean model to search user records 48 and/or search terms that contain a specific inmate account number 60 and/or an inmate name and/or a unique inmate user ID in the database 44 based on search terms received from the civilian profile through the website hosting server 34 and/or received from the application server 38. For example, the civilian may not know the inmate account number and may search the database for a specific inmate by the inmate's name or unique inmate user ID. The civilian may need the unique inmate ID 56 in order to opt-into the system 10.

In the illustrated embodiment, the application server 38 is programmed to monitor activities associated with the plurality of user records 48 and process the messages being sent and received. Once the application server 38 receives a message from the civilian profile 54, the application server 38 may be configured to determine whether the civilian profile is a current civilian profile or not. If the civilian profile is not a current civilian profile, the application server may send a message to the civilian profile in order for the civilian profile to opt-into the system 10. The application server 38 is further configured to pair the civilian profile with the inmate profile by accessing the database 44 to receive the data including the inmate profile that is paired with the civilian profile. In another embodiment, the inmate profile may be paired with more than one civilian profile. The inmate profile may have separate account numbers paired with different civilian profiles. The application server 38 may associate each inmate account number with a specific SIM card/phone number.

In order for the application server 38 to process the message received from the opted in (current) civilian profile, the application server 38 is configured to process the message based on a predefined criteria 84. The predefined criteria 84 includes a splitting process 86, a holding process 88, and a removal process 90. The splitting process 86 includes determining whether the message sent from the civilian profile, or from the inmate profile to the civilian profile, contains a specific amount of characters, such as a message that contains over 160 characters, which triggers the message to be split. If the message exceeds the 160 character limit, the entire message may be split into at least two messages. The at least two messages may not contain over 160 characters per message. The amount of characters may be set at any number up to 160 characters per message, depending on the system 10. The holding process 88 includes determining whether the system 10 has sent a predetermined amount of messages in a predetermined amount of time. For example, the predetermined amount of time may include fifty (50) to sixty (60) messages in one (1) hour. The predetermined amount of time may change depending on the carrier of phone service. In addition, the predetermined amount may be limited per carrier. For example, only fifty (50) messages may be sent for all Sprint™ users in an hour and only fifty-five (55) messages may be sent for all Verizon™ users in an hour of time, so on and so forth for all possible service providers. If the amount of messages in one (1) hour has been exceeded, the application server 38 may hold the message being sent until the time has expired. Once the time has expired, the application server 38 may complete the process of sending the message to the correct profile. In addition, the removal process 90 includes the removal of images and emoticons from the message being sent by the civilian profile (or from the inmate profile). The application server 38 may remove any images from the message sent and then send the image removed to the $3^{rd}$ party server 16. The $3^{rd}$ party server 16 may print out the image and "snail mail" or deliver the image to the inmate. Once the application server 38 has processed the message through the splitting process 86, the holding process 88, and the removal process 90, the application server 38 may send the message to the paired inmate profile.

In another embodiment, the application server 38 is programmed to detect the occurrence of triggering events 70 associated with the plurality of user records and the messages being sent and received. In addition, the application server 38 may also be programmed to monitor the information associated with the 3$^{rd}$ party server 16 including sending the image information to the 3$^{rd}$ party server 16 to be printed for viewing. The application server 38 may also be programmed to receive updates to user profiles for use in determining whether the inmate profile 52 has added or removed any inmate account numbers 60 associated with civilian user IDs.

In the illustrated embodiment, the application server 38 is programmed to access the database 44 including a plurality of user records 48. In addition, the application server 38 is configured to receive a message from a civilian profile. The application server 38 is then configured to determine whether the civilian profile is a current civilian profile. The application server 38 is configured to receive an inmate account number associated with the message. Then the application server 38 is configured to process the message. The message then may meet a predefined criteria. The application server 38 is then configured to pair the message with the inmate account number. In addition, the application server 38 is configured to send the message to the inmate account number.

The application server 38 may send a request or triggering event 70 to the external server 42 triggering an action event from the external server 40 to print and send images to the inmate sent from the civilian. For example, in Action005 shown in FIG. 7, the application server 38 is configured to send removed images to the 3rd party server 16. The images are removed from the message and sent to the 3$^{rd}$ party server 16 to be printed and sent to the inmate.

In the illustrated embodiment, as shown in FIG. 8, the application server 38 is programmed to receive a message from a non-current civilian profile and send a second message to the non-current civilian profile. The second message includes a request that asks for the inmate account number to be associated to the non-current civilian profile. The non-current user may send back a name of an inmate or the inmate account number, which will allow the application server 38 to determine the inmate user ID to pair the new non-current civilian profile with the existing inmate profile. Once the application server 38 has paired the new civilian profile with an existing inmate user ID by creating a new account number associated with the existing inmate user ID, the non-current civilian profile will be marked as a current civilian profile. For example, in FIG. 8, Molly859 sent a message to the application server 38 and before the inmate receives the message, the system 10 may pair the civilian with the intended inmate.

In another embodiment, illustrated in FIG. 8, the application server 38 is configured to determine whether the current civilian profile is associated with more than one inmate account number. The application server 38 may determine the inmate account number that is associated with the current civilian profile and determine the inmate account number that is associated with the message received. Then the application server 38 will pair the correct inmate account number with the received message from a civilian. For example, Mary379, is paired with both account numbers 123456 and 741852. This allows the system 10 to pair Mary379 with two separate inmate account numbers.

In various embodiments, the application server 38 may remove predefined criteria 84 from the messages sent to the inmates. The predefined criteria 84 may include a predetermined amount of messages to be sent in a predetermined amount of time. As described above, the application server 38 may hold back messages if the threshold amount of messages has already been sent. In addition, the application server 38 may remove characters from the message and split the message into multiple messages if the message sent includes too many characters. In one embodiment, each message must be less than one hundred sixty (160) characters. The application server 38 is also configured to remove at least one emoticon from the message sent by the user and at least one image. The application server 38 is also configured to hold onto the message if the predetermined amount of messages to be sent in the predetermined amount of time has been exceeded and send the message once the predetermined amount of time has elapsed.

In one embodiment, the application server 38 is further configured to determine whether the inmate account balance is paid for or if the account is outstanding. If the account balance is not paid for or outstanding, the application server 38 may hold onto the message until the account balance is up-to-date. The application server 38 is configured to send a third message to the civilian profile if the account balance is not up-to-date. Then, once the application server 38 receives a payment from either the inmate account or from the civilian profile to pay for the inmate account balance, the application server 38 may send the message, originally sent from the civilian, to the inmate once the account balance has been paid.

The application server 38 is configured to receive information from the website hosting server 34 and the search engine server 36, and send the information to the database server 42 to be stored in the database 44. In addition, the application server 38 is configured to receive action events 74 from the website hosting server 34 and the search engine server 36 and in response is configured to send triggering events 70 back to the plurality of servers 34, 36, 38, 40, 42. The application server 38 is configured to monitor the action events 74 and the triggering events 70 between all of the servers in the system 10. In another embodiment, the database server 42 receives all of the information collected by the application server 38 and stores the information in the database 44. This information includes messages sent and received, user profiles, and inmate account balances.

The external server 40 is configured to interact with the 3rd party server 16 that is outside of the application server 38. In addition, the external server 40 is configured to connect with the 3rd party server 16 using secret authentication mechanisms, application keys, call different methods on the external server 40, APIs, and reformat the results of the data back for use by the application server 38 so that the application server 38 can send the data to the website hosting server 34 to be displayed on the user computing device 14. The external server 40 is configured to be a bridge between the products and/or services completely separate from the application server 38. The products and/or services that are outside of the application server 38 include all external services, for example, any image printing service, carrier determining service, and/or an optical character recognition system. These products and/or services may provide information to the application server 38 that the sent images are ready for pick-up to be mailed to the inmates, and/or any information that may affect the data that is outside of the system 10.

Figure 3:
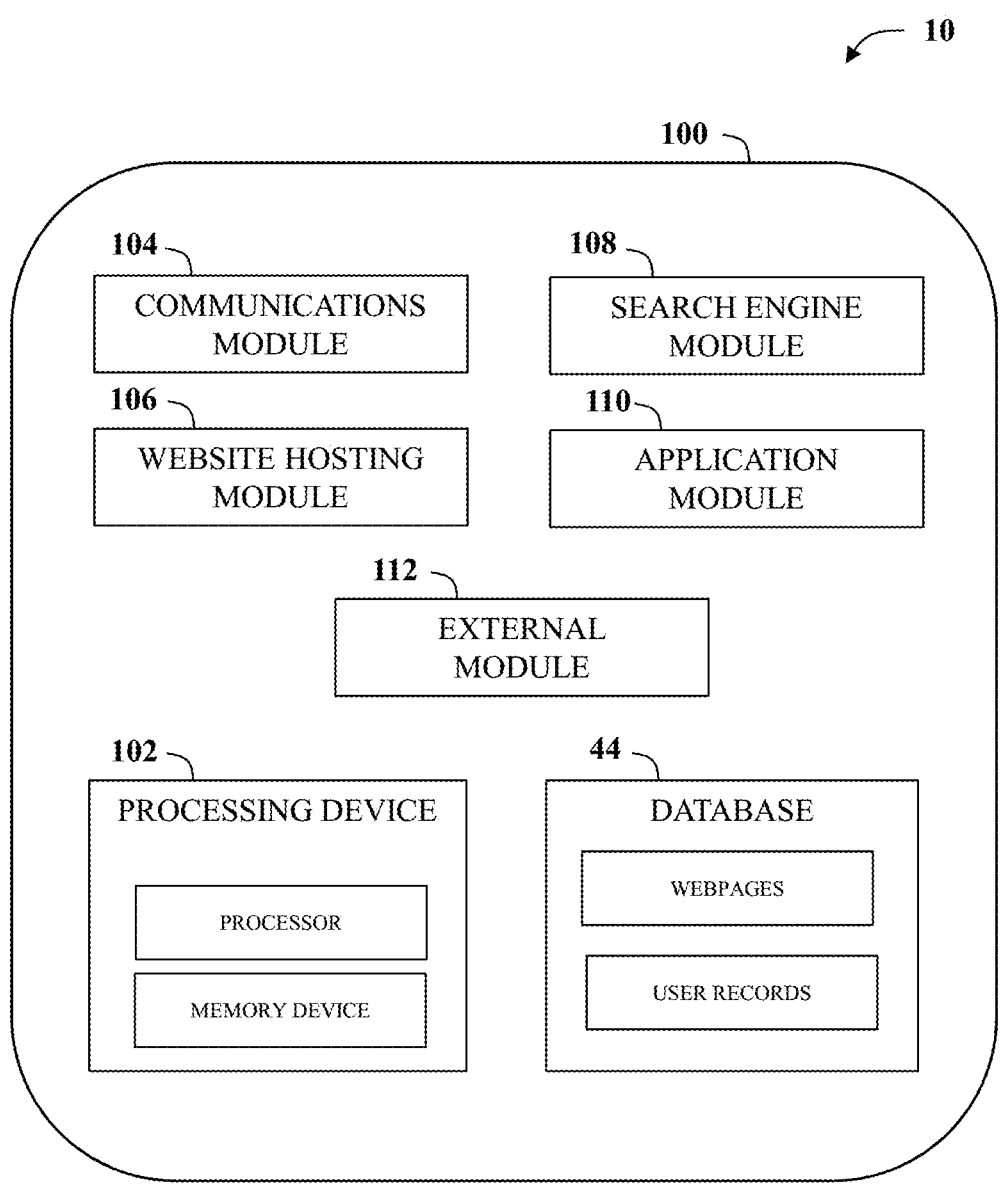
FIG. 3 is a schematic view illustrating example components of a server computer that may be used with the system shown in FIG. 1.

Referring to FIG. 3, in one embodiment, the system 10 may include a system server 100 that is configured to perform the functions of the website hosting server 34, the search engine server 36, the application server 38, the external server 40, and the database server 42. In the illustrated embodiment, the system server 100 includes a processing device 102 and the database 44.

The processing device 102 executes various programs, and thereby controls components of the system server 100 according to user instructions received from the user computing device 14. The processing device 102 may include memory, e.g., read only memory (ROM) and random access memory (RAM), storing processor-executable instructions and one or more processors that execute the processor-executable instructions. In embodiments where the processing device 102 includes two or more processors, the processors can operate in a parallel or distributed manner. In one example, the processing device 102 may execute a communications module 104, a website hosting module 106, a search engine module 108, an application module 110, and an external module 112.

The processing device 102 may also include a memory device for storing programs and information in the database 44, and retrieving information from the database 44 that is used by the processor to perform various functions described herein. The memory device may include, but is not limited to, a hard disc drive, an optical disc drive, and/or a flash memory drive. Further, the memory device may be distributed and located at multiple locations.

The communications module 104 retrieves various data and information from the database 44 and sends information to the user computing device 14 via the communications network 18 to enable the user to access and interact with the system 10. In one embodiment, the communications module 104 displays various images on a graphical interface of the user computing device 14 preferably by using computer graphics and image data stored in the database 44 including, but not limited to, user records, messages, and/or any suitable information and/or images that enable the system 10 to function as described herein.

The website hosting module 106 may be programmed to perform some or all of the functions of the website hosting server 34 including hosting various web pages associated with one or more websites that are stored in the database 44 and that are accessible to the user via the user computing device 14. The website hosting module 106 may be programmed to generate and display webpages associated with a website in response to requests being received from users via corresponding web browsers.

The search engine module 108 may be programmed to perform some or all of the functions of the search engine server 36 including generating and storing search data in response to the user search request and/or application module 110 search requests.

The application module 110 may be programmed to perform some or all of the functions of the application server 38 including sending and receiving messages amongst the users, processing the messages, detecting trigger events from actions, and/or generating the messages between all of the modules.

The external module 112 may be programmed to perform some or all of the functions of the external server 40 including generating, receiving, and storing the external data including data from the 3rd party server computer 16.

Figure 4:
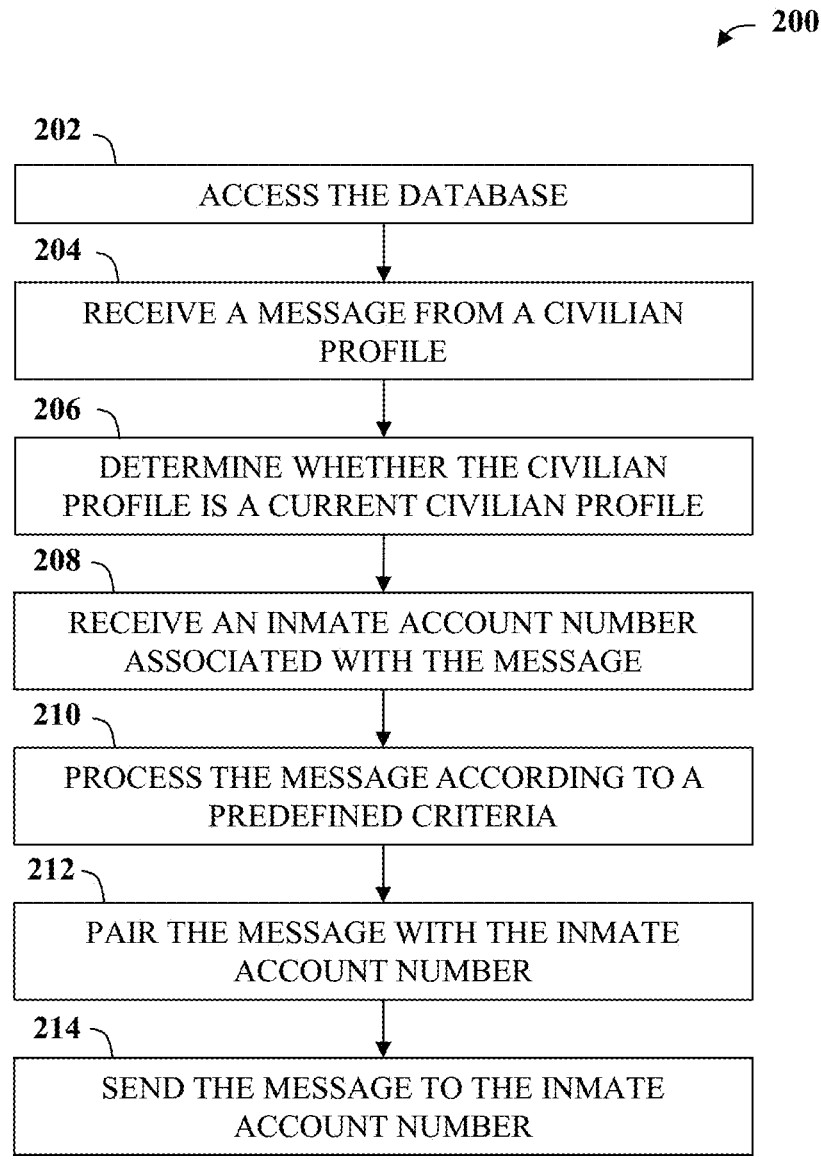
FIG. 4 is a flowchart of a method, according to one embodiment of the present invention, that may be used with the system shown in FIG. 1.

Referring to FIG. 4, a flowchart of one embodiment of a method 200, according to the present invention, that may be used with the system 10 for providing controlled communications between inmates and civilians. The method 200 includes a plurality of steps. Each method step may be performed independently of, or in combination with, other method steps. Portions of the method may be performed by any one of, or any combination of, the components of the system 10.

In method step 202, the application server 38 accesses the database 44 that includes a plurality of civilian profiles and a plurality of inmate profiles. Each civilian profile includes a civilian user ID, a mobile ID 64 associated with a mobile device, and at least one inmate account number. Each inmate profile includes an inmate user ID, a current account balance, and at least one account number. In method step 204, the application server 38 is configured to receive a message from a civilian profile.

In method step 206, the application server 38 is configured to determine whether the civilian profile is a current civilian profile. The message may be received from a non-current civilian profile. In one embodiment, the application server 38 receives a message from a non-current civilian profile. The application server 38 sends a second message to the non-current civilian profile. The second message requests the inmate account number 60 to be associated to the non-current civilian profile. The application server 38 receives the inmate account number 60 to be associated with the non-current civilian profile and the application server 38 may send information to the database 44 to mark the non-current civilian profile as a current civilian profile.

Further, in method step 208, the application server 38 is configured to receive an inmate account number 60 associated with the message. The application server 38 determines whether the current civilian profile is associated with more than one inmate account number 60. The application server 38 receives from the database 44 the inmate account number 60 that is associated with the current civilian profile. Then, the application server 38 determines the inmate account number 60 that is associated with the message received.

In method step 210, the application server 38 processes the message received from the civilian user ID. The messages must meet a predefined criteria. The predefined criteria 84 includes a predetermined amount of messages to be sent in a predetermined amount of time, a predetermined amount of characters included in the message, at least one emoticons, and at least one image.

In one embodiment, the application server 38 determines the predetermined amount of messages to be sent in the predetermined amount of time and determines whether the message includes the predetermined amount of characters included in the message. Once the message includes the predetermined amount of characters, the application server 38 removes the at least one emoticon from the message and/or removes the at least one image from the message.

In another embodiment, the application server 38 breaks the message into a plurality of messages if the message includes the predetermined amount of characters. In addition, the application server 38 holds onto the message if the predetermined amount of messages to be sent in the predetermined amount of time has been exceeded. In method step 212, the application server 38 pairs the message with the inmate account number 60.

In yet another embodiment, the application server 38 determines whether the inmate account balance is paid for or is outstanding (shown in FIG. 9). If the account balance is not paid, the application server 38 may hold onto the message until the account balance is up-to-date. The application server 38 sends a third message to the civilian profile if the account balance is not up-to-date. The application server 38 may receive a payment from the civilian profile to pay for the inmate account balance. Once the account is paid for, or up to date, the application server 38 sends the message to the inmate once the account balance has been paid. In method step 214, the application server 38 sends the message to the inmate account number 60.

In various embodiments, the system 10 limits the number of SMS/MMS messages sent to a SIM card during a period of time. This allows the SIM card to not burn out and to not be blocked by the cell phone companies. In addition, without limiting the flow of messages, there is no chance that a company would be successful for long using SIM cards to send messages. The flow of information goes from the civilian to the SIM card modem pool or the cell phone with a SMS application, is processed by the system and through an ITS server to an ATG server, and then to the individual prison.

In another embodiment, the flow of information is the same as described above. When an inmate adds a new phone number to the list of contacts, the system 10 assigns a phone number/SIM card to the number. Instead of assigning a phone number for each inmate to use, the system 10 allows the use of a single phone number/SIM card for thousands of contacts. This allows the company to not have a large overhead. For example, instead of having unique phone numbers for each inmate, the system 10 allows thousands of inmates to use one phone number/SIM card. Another example includes the use of over sixteen thousand (16,000) inmates and the inmates contacts are able to be spread over twenty-four (24) phone numbers/SIM cards. Overall, the cost of 24 phone numbers is substantially cheaper than the cost of 16,000.

In various embodiments, the system 10 assigns each civilian phone number to a user computing device 14, never assigning a civilian's phone number to a user computing device 14 more than for one inmate. This allows the inmates to not have an individual phone number. Each user computing device 14 includes a device ID and a phone number. When a text message comes in on one of the user computing devices 14, the system 10 looks at the device ID and then looks for the phone number sending the text. The system 10 is able to tell who the civilian is intending to text. The advantage is to not allow inmates to have individual phone numbers and helps with security issues.

In another embodiment, a civilian may send a message to an inmate that does not have an active account (no money in the account). The system 10 may send a response to the civilian with instructions on how to activate the account. The system 10 may send a link that allows the civilian to pay the inmate account online and activate the account.

Figure 10:
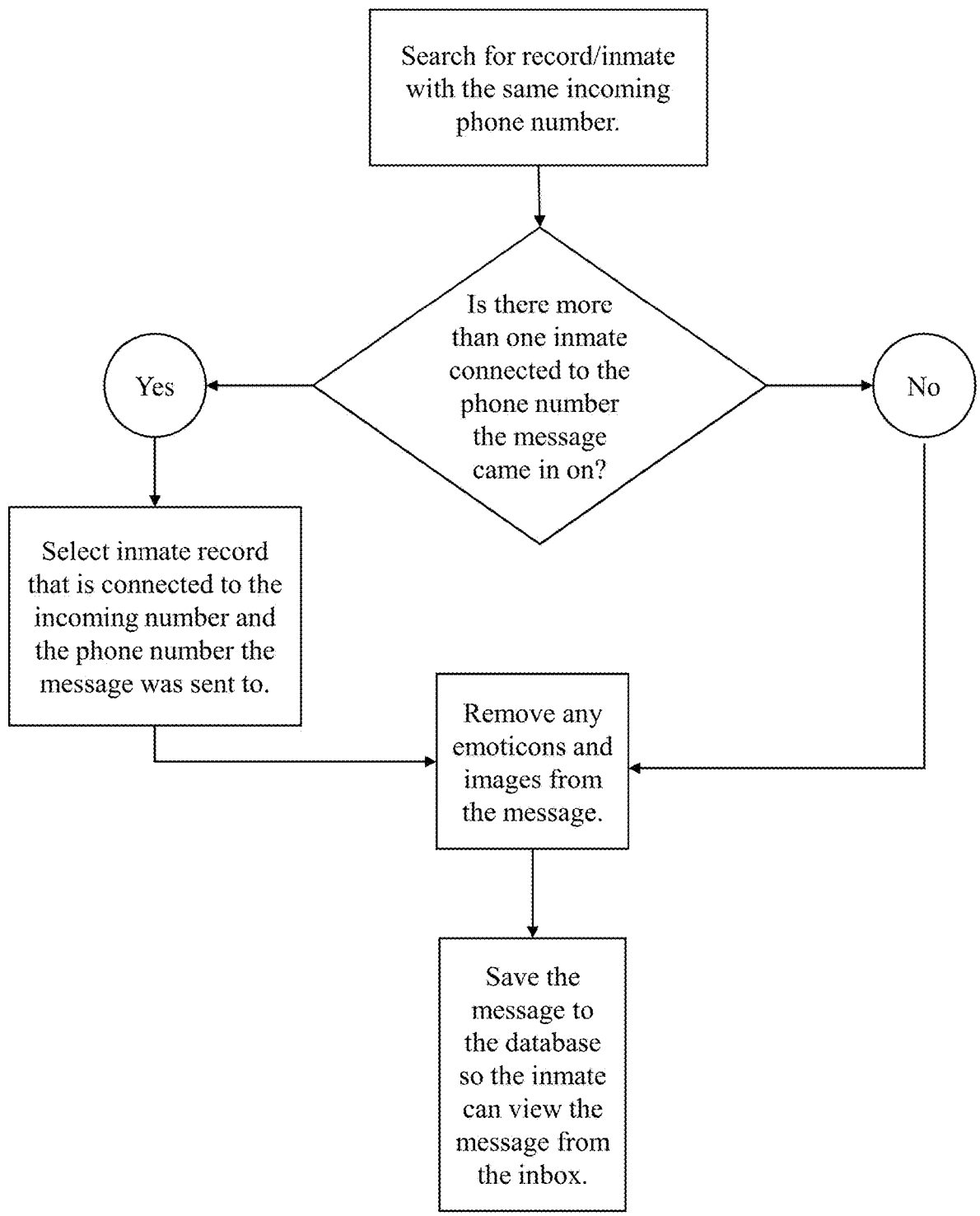
FIGS. 10-13 is a flowchart of a method, according to one embodiment of the present invention, for use with the system of FIG. 1.

Illustrated in FIG. 10, in one embodiment, the system 10 may search for a record and/or inmate with the same incoming phone number. The system 10 then determines if there is more than one inmate connected to the phone number the message was delivered. If there is more than one inmate, the system 10 may select the inmate record that is connected to the incoming number and the phone number the message was sent to. Then the system 10 may remove any emoticons and images from the message. The message may then be saved to the database so the inmate can view the message from their inbox. If there is not more than one inmate, the system 10 may remove any emoticons and images from the message and save the message to the database so the inmate can view the message from their inbox.

Figure 11:
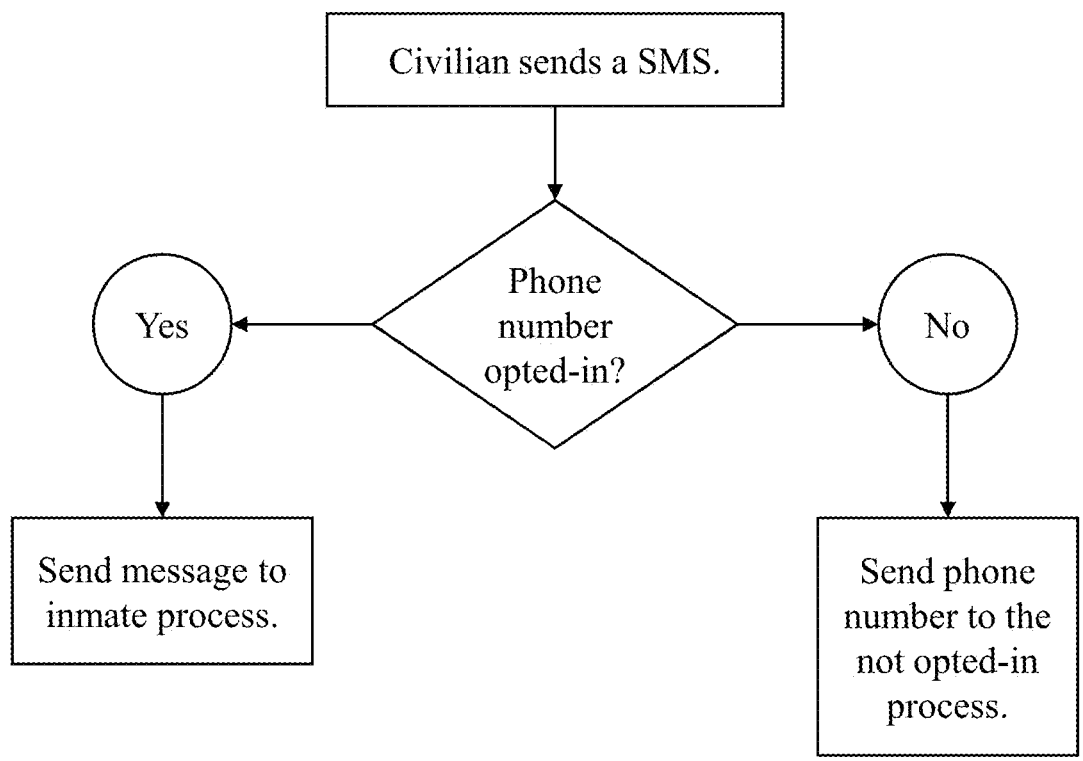

In one embodiment, illustrated in FIG. 11, if the civilian sends a SMS message, the system 10 may determine if the phone number is opted-in or not. If the phone number is not opted-in, the system 10 may require the phone number to go through the opt-in process. If the phone number is opted-in, the SMS message may be sent to the inmate.

Figure 12:
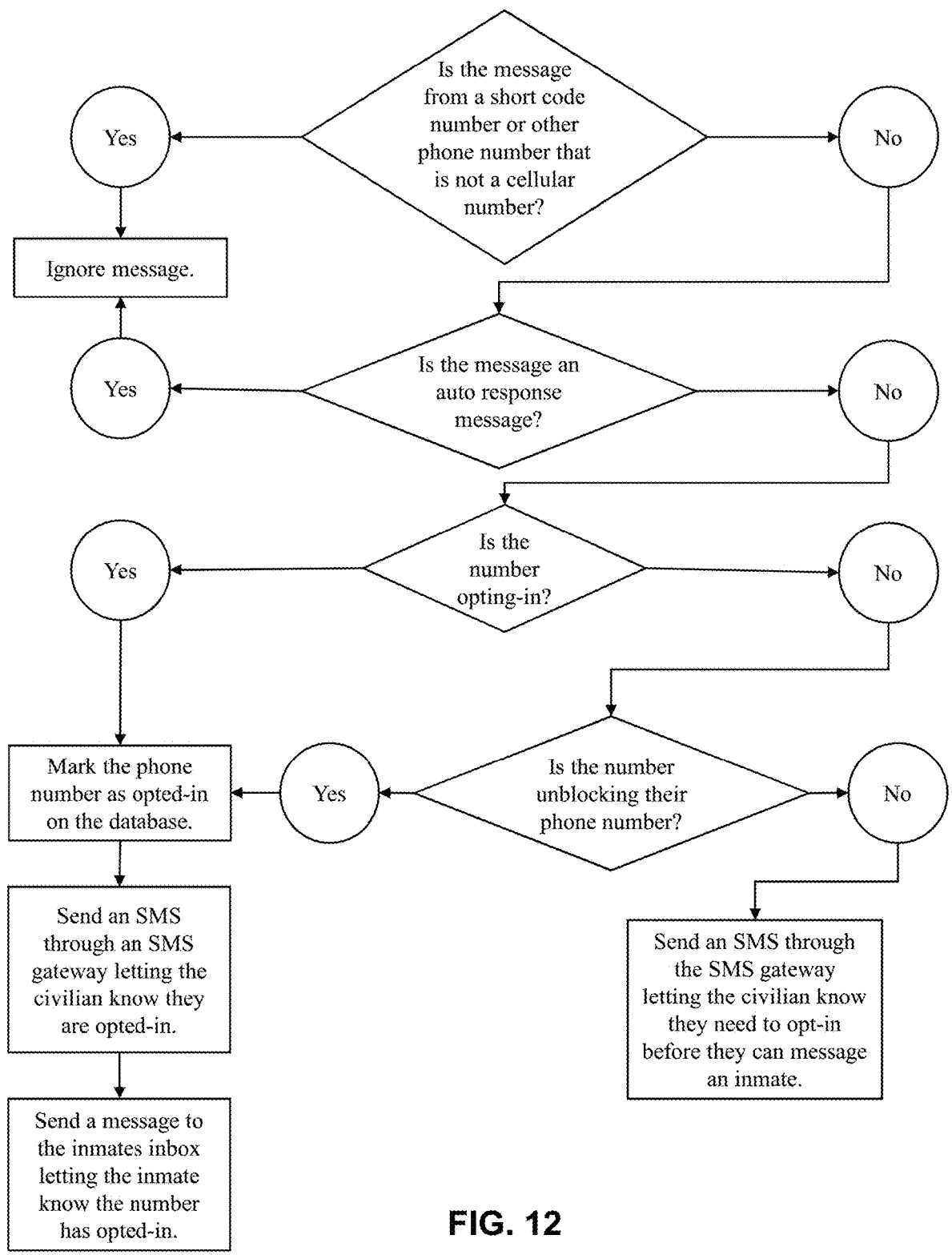

FIG. 12 illustrates the process if the message is received from a phone number that is not associated with a mobile device 20 or if the mobile device 20 is not a current user. If the message is from a short code number or other phone number that is not a cellular number, the system 10 may ignore the message. If the message is not a short code, the system 10 may determine if the message is an auto response message, and if so then ignore the message. Now, if the message is not received from a short code phone nor from an auto response message, the system 10 may determine whether the phone number is opted-in or not. If the message is not opted-in, the system 10 may ask the phone number to unblock their phone number. If the phone number continues to deny access to the phone number, the system 10 may send an SMS through an SMS gateway letting the phone number know that in order to message an inmate, the phone number must be opted-in. If the phone number decides to opt-in or is already opted-in, the system 10 may mark the phone number as opted-in and save the data to the database. Next, the system 10 may send an SMS through an SMS gateway letting the phone number know the opt-in process was successful. The system 10 then sends a message to the inmate inbox letting the inmate know the number has opted-in for messaging.

Figure 13:
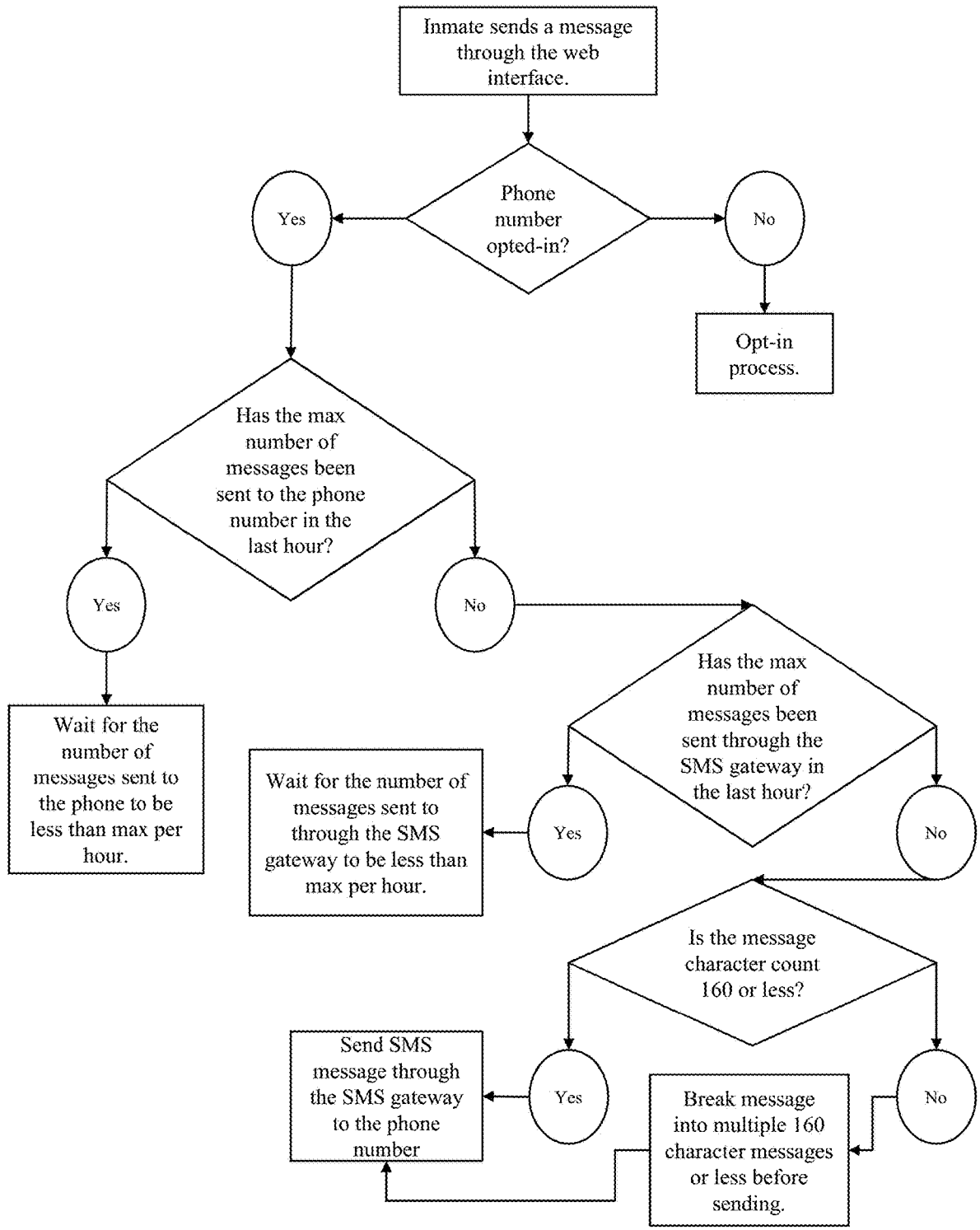

In another embodiment, FIG. 13 illustrates the process once the inmate sends a message through the system 10. The system 10 determines whether the receiving phone number has opted-into the system 10 or not. If the receiving phone number has not opted-in, the system 10 will require the phone to go through the opt-in steps, illustrated in FIG. 11. If the phone number is opted-in, the system 10 then determines if the max number of message has been sent to the phone number in the last hour or not. If the max number has been sent, the system 10 may wait for the number of messages sent to the phone to be less than the max amount per hour. If the max has not been reached, the system 10 may determine if the max number of messages has been sent through the SMS gateway in the last hour. Again, if the max has been reached, the system 10 may wait for the number of messages sent through the SMS gateway to be less than the max per hour. Once the time has elapsed for both the max of messages to the phone number and the max amount through the SMS gateway, the system 10 determines whether the message contains one hundred sixty (160) characters or less. If the message contains more than one hundred sixty (160) characters, the message may be broken into multiple messages of one hundred sixty (160) characters or less before sending. Then the message is sent through the SMS gateway to the phone number.

In one embodiment, the database 44 includes a second user records list 114 (shown in FIGS. 14 and 15) that includes a plurality of user records 48. Each user record 48 includes a unique user profile 50. The unique user profile 50 can be an inmate profile 52 or a civilian profile 54. Each inmate profile 52 includes a unique user inmate user ID 56, a current account balance 58, at least one civilian or user account number 60, and a carrier 116. The at least one civilian account number 60 is associated with a civilian user ID 62. The civilian user ID 62 may also be a code word to help identify the civilian profile 54. Each civilian profile 54 includes a unique civilian user ID 62 associated with a corresponding civilian, a mobile ID 64 associated with a mobile computing device 20, at least one inmate account number 60, and a carrier 118. The unique inmate user ID 56 may be paired with more than one associated civilian mobile ID 64. For example, as shown in FIG. 14, Bob378 is paired with both associated mobile ID 123-456-7899 and mobile ID 987-654-3211. The unique civilian user ID 62 and the unique inmate user ID 56 include user identifying data such as, for example, a unique ID and/or password, and may also include user contact information such as, for example, a phone number, an e-mail, and/or a mobile device data associated with a mobile computing device 20 associated with the user. For example, the mobile device data may include, but is not limited to, the unique mobile device ID 64, operating system, phone number, IP address, mobile device API, a carrier 116/118, and/or any suitable information that enables the system 10 to communicate with the corresponding mobile computing device 20. The carrier 116/118 may also include a carrier ID 120. For example, the carrier 116 may be AT&T and the carrier ID 120 may be 123456. The carrier ID 120 is used to determine the specific user associated with the carrier ID 120. The data associated with the inmate account number 60 includes the inmate identifying data such as, for example, a unique ID and/or password and an account balance 58. Each inmate account number 60 is associated with a separate device 14 to facilitate the data between the system 10 and the civilian mobile user device 20.

In one embodiment, the database 44 includes the action event record list 66 (shown in FIG. 16) that includes the plurality of action event records 68. Each action event record 68 may include the triggering event 70, the action event data 72, and the action event 74. The system 10 may initiate the action event 74 once the action event 74 is triggered by the triggering event 70. By the action event 74 being triggered by the triggering event 70, the action event 74 may then send the action event 74 to the corresponding server, dependent on which action event 74 has been triggered. The action event data 72 includes information and data including, but is not limited to, determining whether the carrier 116/118 of the new user is an allowed carrier 124 or not, upon determining the new user carrier 116/118, send to either an allowed list 124 or a blocked list of carriers 126, send the new user information to a $3^{rd}$ party server 16 to determine the carrier 116/118, and convert the plurality of SMS messages into one MMS message. As shown in FIG. 16, the action event data 72 may include data associated with the corresponding action record. In one embodiment, the action event data 72, for example, Action010, includes information that enables the system 10 to determine whether the carrier 116/118 of the new user is an allowed carrier 124 or not. The triggering event data includes data associated with the triggering event 70 that includes an event or occurrence that may be detected by the system 10. The triggering events 70 may include, but are not limited to, to determine the carrier 116/118 of the new user, send the user profile to an appropriate list 122, send received carrier to $3^{rd}$ party server 16, receive SMS messages that includes a predetermined amount of characters, and receive a plurality of SMS messages. Once the system 10 initiates the triggering event 70, the triggering event 70 triggers the corresponding action event 74, which will send the action event data 72 to the corresponding server 34, 36, 38, 40, 42.

Figure 18:
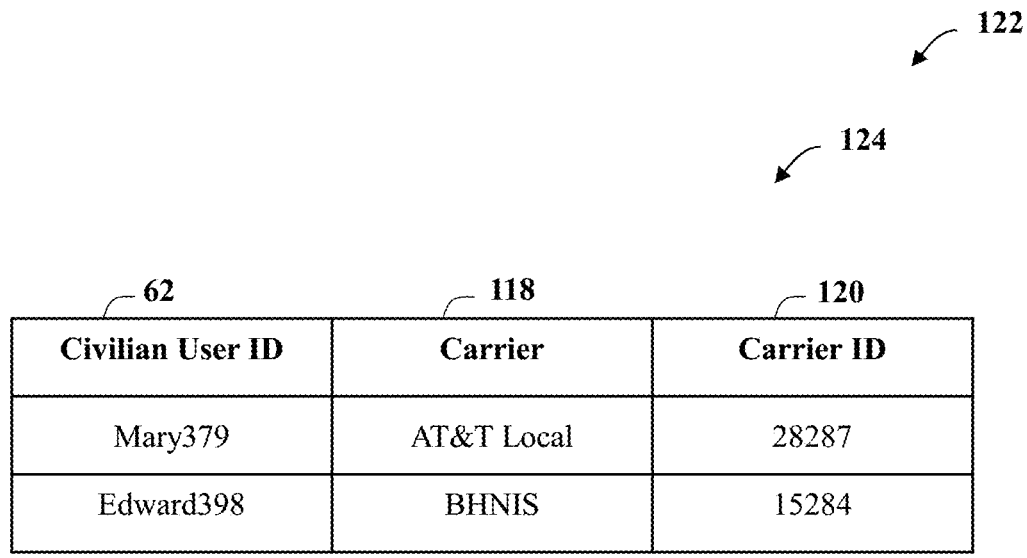
Figure 19:
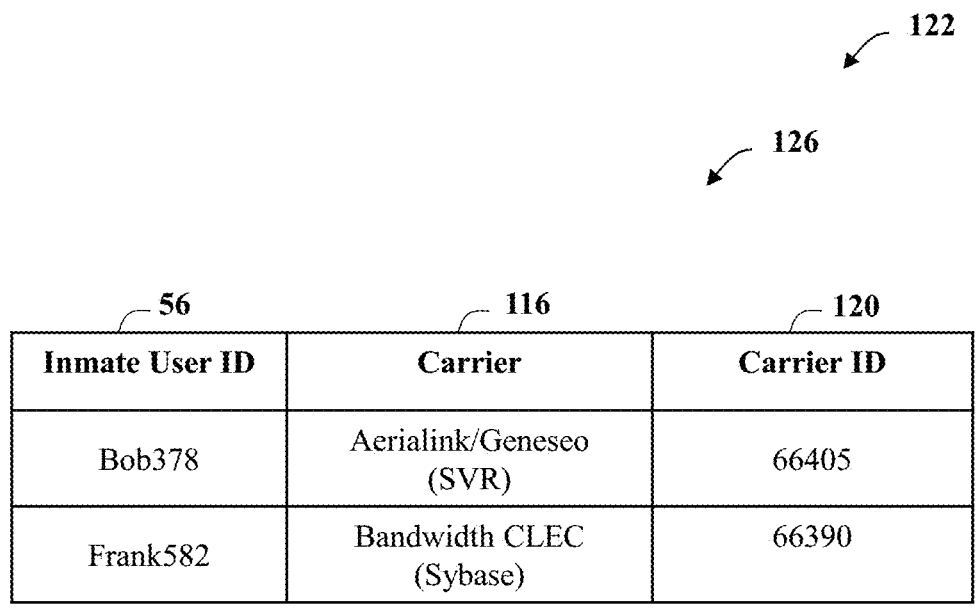

In the illustrated embodiment, the application server 38 is programmed to monitor activities associated with the plurality of user records 48 and process the messages being sent and received. The system 10 is configured to prevent correspondence between inmates that are using other carriers 118 from sending and receiving messages. For example, the system 10 may prevent inmates from sending and receiving messages from other inmates in different facilities. The system 10 for facilitating incoming and outgoing electronic messages includes the database 44 and the application server 38. The database 44 includes a plurality of user records 48. The user records 48 include a plurality of user profiles and a plurality of inmate profiles. Each of the user profiles includes a user ID 62, a mobile ID 64 associated with a mobile device 20, a carrier 116, and at least one inmate account number 60, and each of the inmate profiles includes an inmate user ID 56, a carrier 118, a current account balance 58, and at least one user account number 60. The application server 38 includes a processor programmed to receive a message from a new user profile, determine a carrier 116/118 of the user profile, process the user profile based on the carrier 116/118, wherein the carrier 116/118 is determined by a triggering event 70, and send the user profile to an appropriate list 122 for future messaging (as shown in FIGS. 18 and 19). The triggering event 70 includes receiving the specific carrier 116/118 of the user profile. Once the application server 38 receives the carrier 116/118, the user profile may be placed into the appropriate list 122. The appropriate list 122 is programmed by the system 10 and separates the user profiles based on the specific carrier 116/118. The appropriate list 122 includes an allowed carrier list 124 and a blocked carrier list 126. For example, an allowed carrier may be AT&T™, Verizon™, and/or Sprint™ and a blocked carrier may be another service that facilitates messages between inmates, such as, for example, Aerialink/Geneseo (SVR). The allowed carrier list 124 is further processed to allow incoming and outgoing messages through the system 10. The blocked carrier list 126 is further blocked from sending and receiving messages through the system 10 between current inmate profiles. The system 10 may use a $3^{rd}$ party server 16 to determine the carrier 116/118 of a new user profile.

In another embodiment, the application server 38 is programmed to detect the occurrence of triggering events 70 associated with the plurality of user records 48 and the messages being sent and received. In addition, the application server 38 may also be programmed to monitor the information associated with the $3^{rd}$ party server 16 including sending the new user profile to the $3^{rd}$ party server 16 to determine the carrier 116/118. The application server 38 may also be programmed to receive updates to user profiles for use in determining whether the user has changed carriers.

The application server 38 may send a request or triggering event 70 to the external server 40 triggering an action event 74 from the external server 40 to determine the carrier 116/118 of the user profile. For example, in Action 012 shown in FIG. 16, the application server 38 is configured to send the new user profile to a $3^{rd}$ party server 16 to determine the new user carrier 116/118 and carrier ID 120.

In one embodiment, as shown in FIG. 16, the application server 38 is programmed to determine a carrier 116/118 of the new user. The application server 38 may determine the carrier 116/118 is using a $3^{rd}$ party server 16. Once the $3^{rd}$ party server 16 determines the carrier 116/118 of the new user, the application server 38 may receive the carrier 116/118 and place the new user profile into the appropriate list 122. If the carrier 116/118 is an approved carrier, the user profile may be placed on the approved list 124 and, if the carrier 116/118 is not an approved carrier, the user profile may be placed on the blocked list 126. For example, as shown in FIG. 18, Mary379 has the carrier 116/118 AT&T™ Local, which is an allowed carrier. Mary379 is placed on the approved list 124 and is able to send messages to inmates and receive messages from inmates using the system 10.

Figure 20:
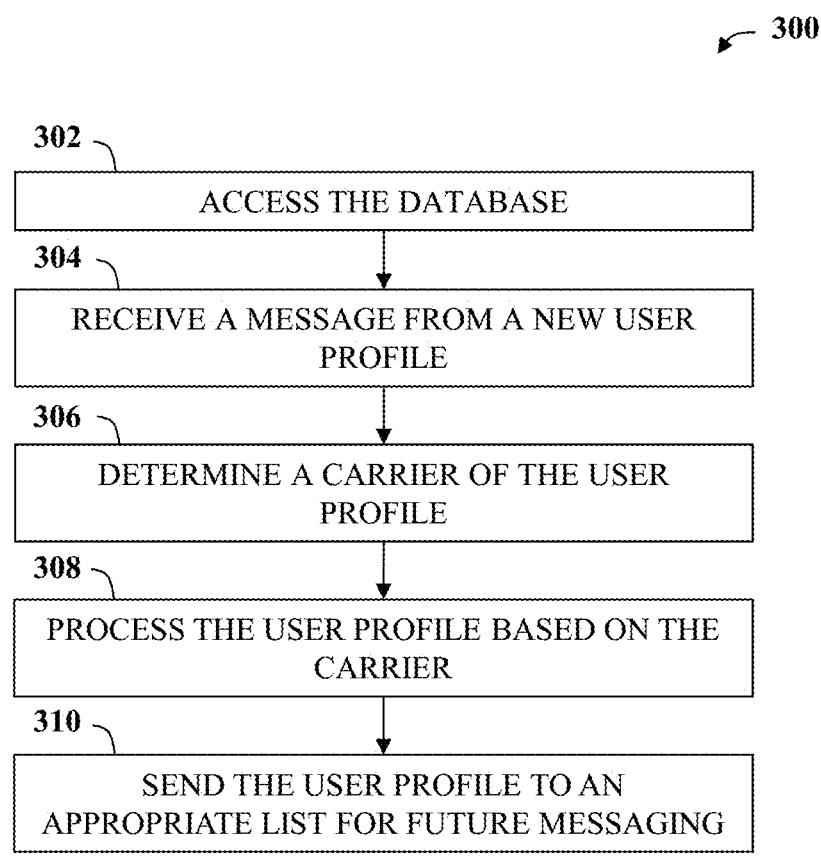
FIGS. 20 and 21, are flowcharts of methods, according to embodiments of the present invention, that may be used with the system shown in FIG. 1

Referring to FIG. 20, a flowchart of another embodiment of a method 300, according to the present invention, may be used with the system 10 for further facilitating incoming and outgoing electronic messages is described. The method 300 includes a plurality of steps. It should be appreciated that each method step may be performed independently of, or in combination with, other method steps. Portions of the method may be performed by any one of, or any combination of, the components of the system 10.

In method step 302, the application server 38 accesses the database 44 including a plurality of user profiles and a plurality of inmate profiles, wherein each of the user profiles includes a user ID 62, a mobile ID 64 associated with a mobile device 20, a carrier 116, and at least one inmate account number 60, wherein each inmate profile includes an inmate user ID 56, a carrier 118, a current account balance 58, and at least one user account number 60. In method step 304, the application server 38 receives a message from a new user profile. In method step 306, the application server 38 determines a carrier 116/118 of the user. In method step 308, the application server 38 processes the user profile based on the carrier 116/118, wherein the carrier 116/118 is determined by a triggering event 70. In method step 310, the application server 38 sends the user profile to an appropriate list 122 for future messaging.

In one embodiment, the system 10 blocks correspondence between users based on the carrier 116/118 of the user computing device 14. For example, some inmates try to communicate with other inmates in other facilities. The system 10 identifies the carrier 116/118 of the incoming message and blocks the message from being transmitted if the user is from another facility. The system 10 may use, for example, IP based phone numbers when trying to determine the carrier 116/118 of the user computing device 14.

In one embodiment, the system 10 receives a new phone number or new user either sending or receiving a message. The system 10 may then query the phone number to determine the carrier 116/118. The system 10 may use a $3^{rd}$ party server 16 to determine the carrier 116/118. The system 10 includes a list of allowed carriers 124 and a list of blocked carriers 126. For example, an allowed carrier may be AT&T™. The system 10 may then determine which list the new phone number is on and send the phone number to be placed on the appropriate list 122. If the new user is allowed, the user may send and receive messages, but if the user is blocked, the user is blocked from sending and receiving messages from other blocked users, for example other current inmates.

In another embodiment, the system 10 for facilitating incoming and outgoing electronic messages includes the database 44 having a plurality of user records 48 and an application server 38 including a processor. The user records 48 include a plurality of user profiles 50 and a plurality of inmate profiles 52. Each of the user profiles 50 includes a user ID 62, a mobile ID 64 associated with a mobile device 20, a carrier 116, and at least one inmate account number 60, and each of the inmate profiles 52 includes an inmate user ID 56, a carrier 118, a current account balance 58, and at least one user account number 60. The processor is programmed to receive a SMS message from a first user, determine whether the SMS message includes a predetermined amount of characters, break the SMS message into a plurality of SMS messages if the message includes the predetermined amount of characters, convert the plurality of SMS messages into a plurality of MMS messages, receive the plurality of MMS messages, wherein the plurality of MMS messages includes an image of the plurality of SMS messages, convert the plurality of MMS messages into a plurality of readable SMS messages, and send the plurality of readable SMS messages to a second user. The application server 38 may send the MMS message to a $3^{rd}$ party server 16 for conversion. The $3^{rd}$ party server 16 may be an optical character recognition system. The optical character recognition system reads the MMS messages from the original SMS message and converts the image to a text file or another SMS message in order to send the message to the second user.

In one embodiment, the system 10 converts messages that exceed a predetermined amount of characters from a SMS message to a MMS message. Some systems do not receive images and therefore cannot receive the MMS message from other users. The system 10 then converts the MMS message back into an SMS message. The system 10 may use optical character recognition (OCR) to convert the MMS message into a SMS message. The OCR may be able to read the photos and convert the image into a text to send to the other user. For example, a first user may send a message that exceeds the predetermined amount of characters. The system 10 may then break the message into multiple MMS messages to be sent to a second user. The second user may not be able to receive MMS messages and the MMS message may have to be converted back into a SMS message. The system 10 may then convert the multiple MMS messages into multiple SMS messages to be sent to the second user.

In one embodiment, in FIG. 17, the application server 38 is configured to convert the MMS message into a readable SMS message. The application server 38 may receive the MMS message from the application server 38. In order to send the MMS message to the user, the application server 38 may send the MMS message to the $3^{rd}$ party server 16 to be converted to a SMS message. The $3^{rd}$ party server 16 may use optical character recognition to detect the words within the MMS message and convert the image into the SMS message. The SMS message may then be sent to a user that may not be able to receive MMS messages. For example, as illustrated in FIG. 17, Mary379 sent a SMS message that exceeded the predetermined amount of characters. The message is then broken into a plurality of MMS messages of the SMS message. The receiving user may not be able to accept MMS messages, and the plurality of MMS messages may need to be converted into a plurality of SMS messages. The application server 38 recognizes the plurality of MMS messages and sends the plurality of MMS messages to the $3^{rd}$ party server 16 where the plurality of MMS messages are converted into a plurality of SMS messages. The plurality of SMS messages may now be sent to the receiving user. For example, inmates are not allowed to receive MMS messages. A user, civilian, may send a SMS message that exceeds the predetermined amount of characters. The message may then be converted into a MMS message. The application server 38 may then convert the MMS message into a SMS message to be sent to the inmate.

Figure 21:
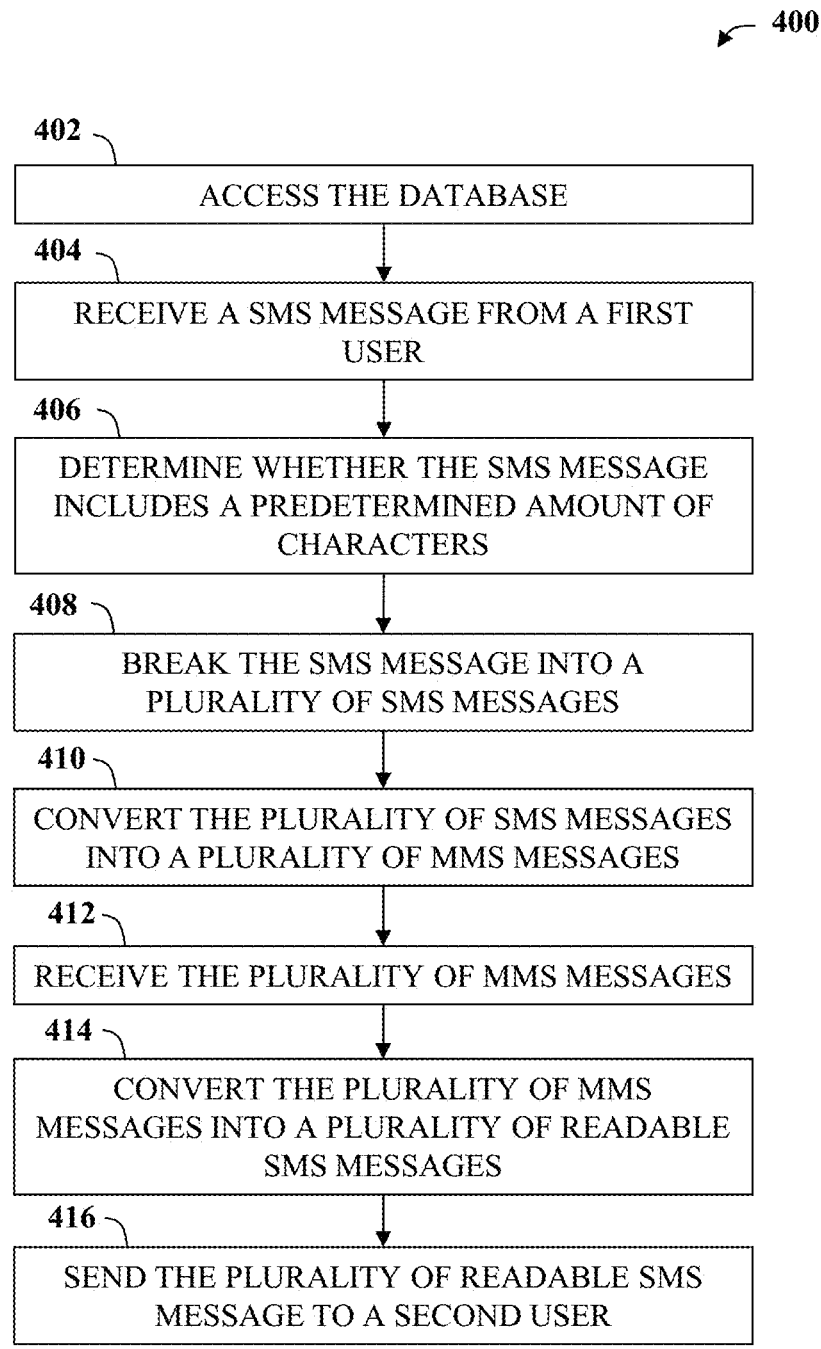

Referring to FIG. 21, a flowchart of yet another embodiment of a method 400, according to the present invention, that may be used with the system 10 for further facilitating incoming and outgoing electronic messages is described. The method 400 includes a plurality of steps. Each method step may be performed independently of, or in combination with, other method steps. It should be appreciated that portions of the method may be performed by any one of, or any combination of, the components of the system 10.

In method step 402, the application server 38 accesses the database 44 including a plurality of user profiles 50 and a plurality of inmate profiles 52, wherein each of the user profiles 50 includes a user ID 62, a mobile ID 64 associated with a mobile device 20, a carrier 116, and at least one inmate account number 60, wherein each inmate profile 52 includes an inmate user ID 56, a carrier 118, a current account balance 58, and at least one user account number 60. In method step 404, the application server 38 receives a SMS message from a first user. In method step 406, the application server 38 determines whether the SMS message includes a predetermined amount of characters. In method step 408, the application server 38 breaks the SMS message into a plurality of SMS messages if the message includes the predetermined amount of characters. In method step 410, the application server 38 converts the plurality of SMS messages into a plurality of MMS messages. In method step 412, the application server 38 receives the plurality of MMS messages, wherein the plurality of MMS messages includes an image of the plurality of SMS messages. In method step 414, the application server 38 converts the plurality of MMS messages into a plurality of readable SMS messages. In method step 416, the application server 38 sends the plurality of readable SMS messages to a second user. In addition, the MMS message may be sent to a $3^{rd}$ party server 16 for further converting the MMS message into a SMS message. The $3^{rd}$ party server 16 may be an optical character recognition system.

A controller, computing device, server or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor".

In some embodiments, the database 44, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DBXX, Microsoft® SQL Server, Sybase®, and PostgreSQL. However, any database 44 may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The present invention has been described in an illustrative manner. The above description of illustrated examples of the present invention, including what is described in the Abstract, are not intended to be exhaustive or to be limitation to the precise forms disclosed. While specific embodiments of, and examples for, the present invention are described herein for illustrative purposes, various equivalent modifications are possible without departing from the broader spirit and scope of the present invention.

What is claimed is:

1. A system for facilitating incoming and outgoing electronic messages, the system comprising:
   a database including a plurality of user records; wherein the user records include a plurality of user profiles and a plurality of inmate profiles, wherein each of the user profiles includes a user ID, a mobile ID associated with a mobile device, a carrier, and at least one inmate account number, wherein each of the inmate profiles includes an inmate user ID, a carrier, a current account balance, and at least one user account number, and an action event record list having a plurality of action event records, wherein each action event record includes a triggering event, action event data, and action event; and
   an application server including a processor programmed to:
   detect the triggering event from the user profile;
   trigger the action event to be performed by the application server or external server based on the triggering event
   perform the action event data based on the action event and
   wherein the action event data includes determining whether the user profile is a current user or a new user and upon determining that the user profile is a current user pairing the current user profile with the inmate profile, determining whether the carrier of a new user profile is an allowed carrier or not and upon determining the carrier of the new user profile sending to an appropriate list for future messaging.

2. The system as set forth in claim 1, wherein the appropriate list includes an allowed carrier list and a blocked carrier list.

3. The system as set forth in claim 2, wherein the allowed carrier list is further processed for allowing incoming and outgoing messages.

4. The system as set forth in claim 2, wherein the blocked carrier list is blocked from sending and receiving messages.

5. The system as set forth in claim 1, wherein the carrier is determined using a $3^{rd}$ party service.

6. A method for facilitating incoming and outgoing electronic messages, the method comprising the steps of:
- accessing, by an application server, a database including a plurality of user profiles and a plurality of inmate profiles, wherein each of the user profiles includes a user ID, a mobile ID associated with a mobile device, a carrier, and at least one inmate account number, wherein each inmate profile includes an inmate user ID, a carrier, a current account balance, and at least one user account number, and an action event record list having a plurality of action event records, wherein each action event record includes a triggering event, action event data, and action event;
- detecting the triggering event, by the application server, from the user profile;
- triggering, by the application server, the action event to be performed by the application server or external server based on the triggering event
- performing, by the application server or the external server, the action event data based on the action event; and
- wherein the action event data includes determining whether the user profile is a current user or a new user and upon determining that the user profile is a current user pairing the current user profile with the inmate profile, determining whether the carrier of a new user profile is an allowed carrier or not and upon determining the carrier of the new user profile sending, by the application server, to an appropriate list for future messaging.

7. The method as set forth in claim 6, wherein the appropriate list includes an allowed carrier list and a blocked carrier list.

8. The method as set forth in claim 7, wherein the allowed carrier list is further processed for allowing incoming and outgoing messages.

9. The method as set forth in claim 7, wherein the blocked carrier list is blocked from sending and receiving messages.

10. The method as set forth in claim 6, wherein the carrier is determined using a $3^{rd}$ party service.

11. One or more non-transitory computer-readable storage media, having computer executable instructions embodied thereon, where when executed by at least one processor, the computer-executable instructions cause the processor to:
- access a database including a plurality of user profiles and a plurality of inmate profiles, wherein each of the user profiles includes a user ID, a mobile ID associated with a mobile device, a carrier, and at least one inmate account number, wherein each of the inmate profiles includes an inmate user ID, a carrier, a current account balance, and at least one user account number, and an action event record list having a plurality of action event records, wherein each action event record includes a triggering event, action event data, and action event;
- detect the triggering event from the user profile;
- trigger the action event to be performed by the application server or external server based on the triggering event;
- perform the action event data based on the action event; and
- wherein the action event data includes determining whether the user profile is a current user or a new user and upon determining that the user profile is a current user pairing the current user profile with the inmate profile, determining whether the carrier of a new user profile is an allowed carrier or not and upon determining the carrier of the new user profile sending to an appropriate list for future messaging.

12. One or more non-transitory computer-readable storage media as set forth in claim 11, wherein the appropriate list includes an allowed carrier list and a blocked carrier.

13. One or more non-transitory computer-readable storage media as set forth in claim 12, wherein the allowed carrier list is further processed for allowing incoming and outgoing messages.

* * * * *

UNITED STATES PATENT AND TRADEMARK OFFICE
CERTIFICATE OF CORRECTION

PATENT NO. : 10,567,929 B2
APPLICATION NO. : 15/926675
DATED : February 18, 2020
INVENTOR(S) : Curtis Gebers et al.

Page 1 of 1

It is certified that error appears in the above-identified patent and that said Letters Patent is hereby corrected as shown below:

In the Claims

At Column 22, Claim number 1, Line number 48-49, delete "based on the triggering event" replace with --based on the triggering event;--

At Column 22, Claim number 1, Line number 50-51, delete "perform the action event data based on the action event and" replace with --perform the action event data based on the action event; and--

At Column 23, Claim number 6, Line number 20, delete "based on the triggering event" replace with --based on the triggering event;--

Signed and Sealed this
Sixteenth Day of June, 2020

Andrei Iancu
*Director of the United States Patent and Trademark Office*